(12) United States Patent
Matthews et al.

(10) Patent No.: US 9,313,140 B2
(45) Date of Patent: Apr. 12, 2016

(54) PACKET PREEMPTION FOR LOW LATENCY

(75) Inventors: Brad Matthews, San Jose, CA (US);
Howard Frazier, Pleasanton, CA (US);
Yongbum Kim, Los Altos Hills, CA
(US); Michael Johas Teener, Santa
Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 489 days.

(21) Appl. No.: 13/174,518

(22) Filed: Jun. 30, 2011

(65) Prior Publication Data

US 2011/0261814 A1 Oct. 27, 2011

Related U.S. Application Data

(63) Continuation-in-part of application No. 12/604,968, filed on Oct. 23, 2009.

(60) Provisional application No. 61/432,967, filed on Jan. 14, 2011.

(51) Int. Cl.
*H04L 12/413* (2006.01)
*H04L 12/863* (2013.01)
*H04L 12/841* (2013.01)

(52) U.S. Cl.
CPC ............ *H04L 47/6215* (2013.01); *H04L 47/28* (2013.01)

(58) Field of Classification Search
CPC ....................................................... H04L 15/56
USPC .......................................................... 370/412
See application file for complete search history.

(56) References Cited

U.S. PATENT DOCUMENTS

| | | | |
|---|---|---|---|
| 5,343,473 A * | 8/1994 | Cidon et al. ................... | 370/465 |
| 5,557,608 A * | 9/1996 | Calvignac et al. ............ | 370/389 |
| 5,568,469 A * | 10/1996 | Sherer et al. .................. | 370/448 |
| 2002/0087716 A1* | 7/2002 | Mustafa ......................... | 709/236 |
| 2005/0275875 A1* | 12/2005 | Jennings, Jr. ................. | 358/1.15 |
| 2006/0109864 A1* | 5/2006 | Oksman ........................ | 370/474 |
| 2006/0268692 A1* | 11/2006 | Wright et al. ................. | 370/229 |
| 2007/0189184 A1 | 8/2007 | Ryu | |

* cited by examiner

*Primary Examiner* — Sulaiman Nooristany
(74) *Attorney, Agent, or Firm* — Brinks Gilson & Lione

(57) ABSTRACT

While transmitting a first Ethernet frame from the first buffer onto an Ethernet link, a first Ethernet device may stop transmitting the first frame prior to completing transmission of the frame. The first Ethernet device may then transmit a second frame from a second buffer onto the Ethernet link. The first Ethernet device may resume transmission of the first frame from the first buffer onto the Ethernet link. A second Ethernet device may receive, via the Ethernet link, a first portion of a first Ethernet frame and store the first portion of the first Ethernet frame in a first buffer. The second Ethernet device may then receive, via the Ethernet link, a second Ethernet frame and store the second Ethernet frame in a second buffer. The second Ethernet device may then receive, via the Ethernet link, a second portion of the first Ethernet frame and append it to the contents of the first buffer.

17 Claims, 17 Drawing Sheets

| Start of Packet 302 | MAC Source Address 304 | MAC Destination Address 306 | Payload 308 | End of Packet 310 |

Packet 1 – In transmission

FIG. 3A

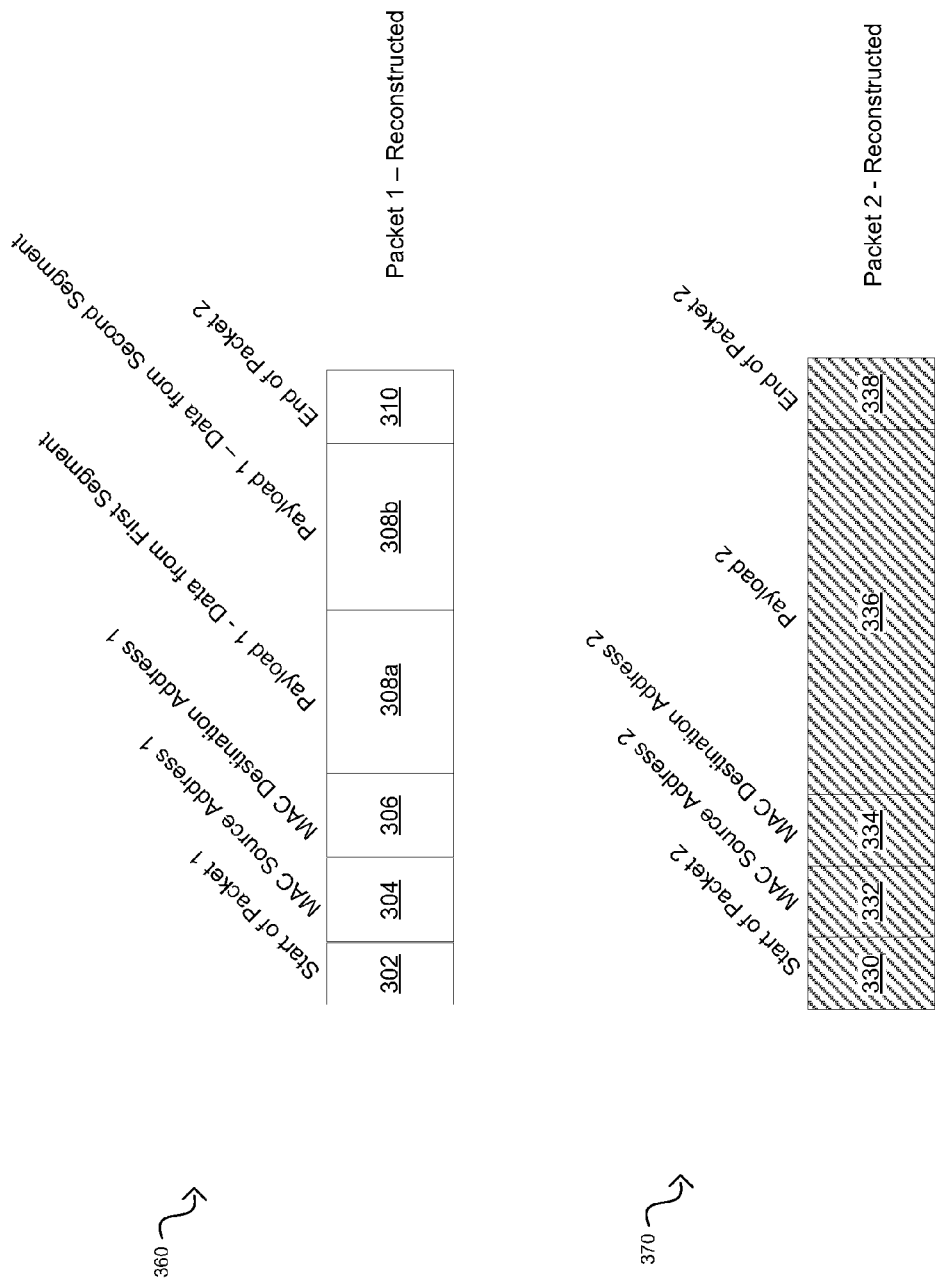

PACKET PREEMPTION FOR LOW LATENCY

CLAIM OF PRIORITY

This application is a continuation-in-part of U.S. patent application Ser. No. 12/604,968 filed on Oct. 23, 2009. This application also makes reference to, claims priority to, and claims the benefit of U.S. Provisional Application Ser. No. 61/432,967, filed on Jan. 14, 2011.

Each of the above stated applications is hereby incorporated herein by reference in its entirety.

INCORPORATION BY REFERENCE

This application also makes reference to U.S. patent application Ser. No. 12/571,147 filed on Sep. 30, 2009.

The above stated application is hereby incorporated herein by reference in its entirety.

FIELD OF THE INVENTION

Certain embodiments of the invention relate to networking. More specifically, certain embodiments of the invention relate to a method and system for packet preemption for low latency.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, in-vehicle Electronic Control Units (ECU), industrial controllers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new networking technologies.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for low latency networking, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is a block diagram illustrating an exemplary first packet that may be transmitted by a network device and/or may be preempted, in accordance with an embodiment of the invention.

FIG. 3C is a block diagram illustrating exemplary packets that have been parsed, extracted and/or reconstructed from a plurality of preempted and/or nested packets and/or packet segments, in accordance with an embodiment of the invention.

DETAILED DESCRIPTION OF THE INVENTION

Figure 1:
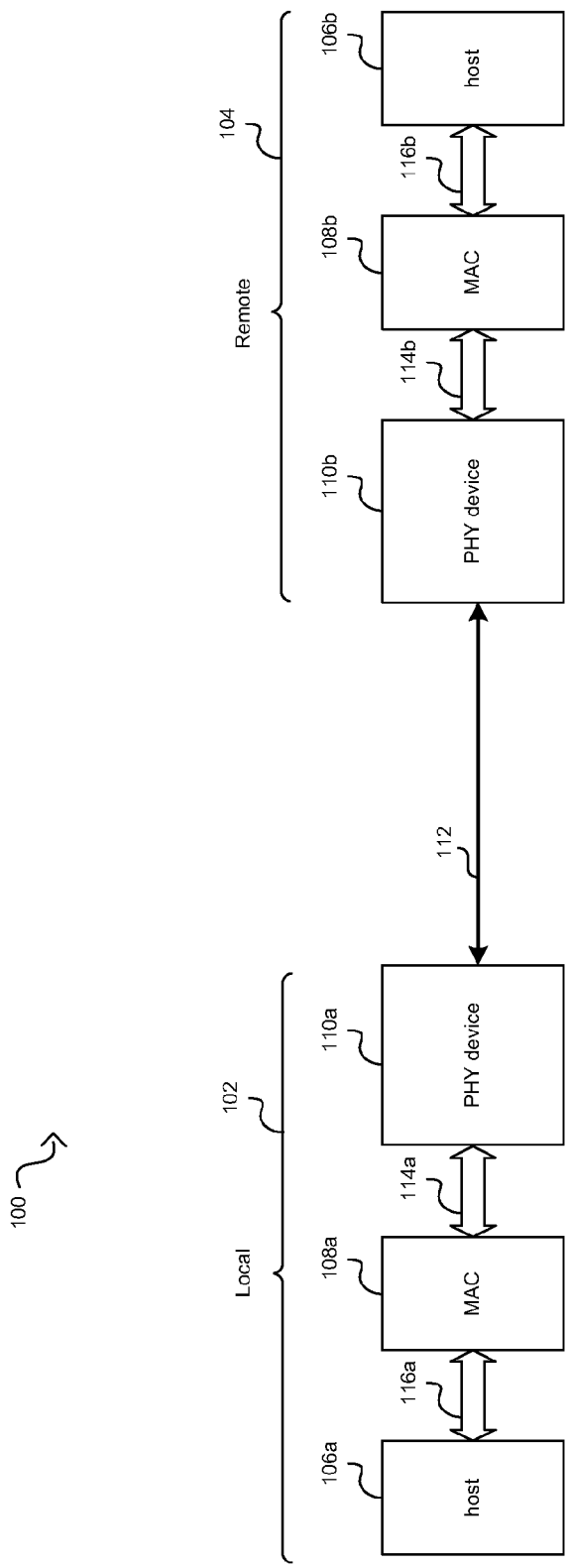
FIG. 1 is a block diagram illustrating an exemplary Ethernet connection between two network devices, in accordance with an embodiment of the invention.

Certain embodiments of the invention can be found in a method and system for packet preemption for low latency. In various embodiments of the invention, an Ethernet device may utilize a first buffer for storing low priority frames and a second buffer for storing high-priority frames, where "low priority" means lower in priority than the high-priority frames, and "high-priority" means higher in priority than the low-priority frames. Certain embodiments of the invention may classify real-time protocol frames as "high-priority", and non-real-time protocol frames as "low-priority" based on real-time protocol needs that are defined in a system. While transmitting a first Ethernet frame from the first buffer onto a network link, the Ethernet device may decide to stop transmitting the first Ethernet frame prior to completing transmission of the first Ethernet frame. Subsequent to this decision, the Ethernet device may stop transmitting the first Ethernet frame from the first buffer onto the Ethernet link. Subsequent to stopping transmission of the first Ethernet frame, the Ethernet device may transmit a second frame from the second buffer onto the Ethernet link. Upon completing transmission of the second frame from the second buffer onto the Ethernet link, the Ethernet device may resume transmission of the first frame from the first buffer onto the Ethernet link. Resuming transmission may comprise retransmitting at least some of the portion, up to the entirety, of the first frame that was transmitted prior to stopping transmission of the first frame. Resuming transmission may comprise resuming transmission of the first frame at the bit immediately following the last bit of the first frame transmitted prior to stopping transmission of the first frame. The deciding may be performed in response to a detection that the second frame is buffered in the second buffer. The decision may be based on how much of the first frame has been transmitted and/or how much of the first frame remains to be transmitted. The Ethernet device may fragment the first Ethernet frame into one or more fragments. Subsequent to deciding to stop transmission of the first frame and prior to stopping transmission, the Ethernet device may finish transmitting an in-progress fragment and append a validation field to the in-progress fragment.

In various embodiments of the invention, a network device may comprise a first buffer utilized for storing received low-priority Ethernet frames and a second buffer utilized for storing received high-priority Ethernet frames. The Ethernet device may receive, via an Ethernet link, a first portion of a low-priority Ethernet frame and store the first portion of the low-priority Ethernet frame in the first buffer. Subsequent to receiving the first portion of the low-priority Ethernet frame, the Ethernet device may receive, via the Ethernet link, a high-priority Ethernet frame and store the high-priority Ethernet frame in the second buffer. Subsequent to receiving the high-priority Ethernet frame, receiving, via the Ethernet link, the Ethernet device may receive the second portion of the low-priority Ethernet frame and append it to the contents of the first buffer. The Ethernet device may parse the received low-priority Ethernet frame to detect fragmentation headers. The Ethernet device may determine whether the second portion of the low-priority Ethernet frame is the last portion of the low-priority Ethernet frame based on a fragmentation header in the second portion of the low-priority Ethernet frame. The Ethernet device may determine whether one or more fragments of the low-priority Ethernet frame were lost or corrupted based on the fragmentation headers.

FIG. 1 is a block diagram illustrating an exemplary Ethernet connection between two network devices, in accordance with an embodiment of the invention. Referring to FIG. 1, there is shown a system 100 that comprises a network device 102 and a network device 104. In addition, there is shown two hosts 106a and 106b, two medium access (MAC) controllers 108a and 108b, a PHY device 110a and a PHY device 110b, interfaces 114a and 114b, bus controller interfaces 116a and 116b and a link 112

The network devices 102 and 104 may be link partners that may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized. In various embodiments of the invention, one or both of the network devices 102 and 104 may be configured and/or operable to comply with one or more standards based on IEEE 802.1, for example 802.1Q, and IEEE 802.3, for example, 802.3az.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP. In some instances, an Ethernet over twisted pair PHY may utilize only one pair. In this regard, however, aspects of the invention may enable varying the number of physical channels via which data is communicated.

The network device 102 may comprise a host 106a, a medium access control (MAC) controller 108a and a PHY device 110a. The network device 104 may comprise a host 106b, a MAC controller 108b, and a PHY device 110b. The PHY device(s) 110a and/or 110b may be pluggable transceiver modules or may be an integrated PHY device. Notwithstanding, the invention is not limited in this regard. In various embodiments of the invention, the network device 102 and/or 104 may comprise, for example, a network switch, a router, computer systems or audio/video (A/V) enabled equipment. In this regard, A/V equipment may, for example, comprise a microphone, an instrument, a sound board, a sound card, a video camera, a media player, a graphics card, or other audio and/or video device. The network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

In various embodiments of the invention, one or both of the network devices 102 and 104 may be configured as an endpoint device and/or one or both of the network devices 102 and 104 may be configured as an internal network core device, for example, a switch. Moreover, one or both of the network devices 102 and 104 may be configured and/or operable to determine latency requirements of packet data that may be pending delivery. In this regard, latency requirements may be related to a rate at which packets may need to be delivered to a destination in order to provide an acceptable quality of communication and/or user experience. Exemplary packets may comprise interactive online gaming packets, premium service class packets, time-sensitive, real-time, and low-latency vehicular or industrial control message packets, voice and/or video communications.

A network device may be configured and/or operable to insert into a packet a mark that may comprise information that may indicate latency requirements of the packet. For example, latency requirements may be based on the type of data that may be within the packet or a class of service associated with the packet. In this regard, one or both of the network devices 102 and 104 may be configured as a network node along a communication path that the marked packet may follow. One or both of the network devices 102 and 104 may be configured and/or operable to inspect the inserted latency information and may determine whether delivery of the marked packet should preempt delivery of a first packet that may have already begun to be transmitted to a link partner but may not yet have completed transmission. In this regard, the transmitting link partner may stop or interrupt transmission of the first packet before transmission is complete and may begin transmission of the second packet In other exemplary embodiments of the invention, one or both of the network devices 102 and 104 may be configured to perform packet inspection, wherein packet headers and/or packet payload may be inspected to determine which type of data and/or latency requirements that the packet may comprise.

The PHY device 110a and the PHY device 110b may each comprise suitable logic, circuitry, interfaces and/or code that may enable communication, for example, transmission and reception of data, between the network device 102 and the network device 104. The PHY device(s) 110a and/or 110b may comprise suitable logic, circuitry, interfaces and/or code that may provide an interface between the network device(s) 102 and/or 104 to an optical and/or copper cable link 112.

The PHY device 110a and/or the PHY device 110b may be configured and/or operable to support, for example, Ethernet over copper, Ethernet over fiber, and/or backplane Ethernet operations. The PHY device 110a and/or the PHY device 110b may enable multi-rate communications, such as 10 Mbps, 100 Mbps, 1000 Mbps (or 1 Gbps), 2.5 Gbps, 4 Gbps, 10 Gbps, 40 Gbps or 100 Gbps for example. In this regard, the PHY device 110a and/or the PHY device 110b may support standard-based data rate limits and/or non-standard data rate limits. Moreover, the PHY device 110a and/or the PHY device 110b may support standard Ethernet link lengths or ranges of operation and/or extended ranges of operation. The PHY device 110a and/or the PHY device 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY device 110a and/or the PHY device 110b may also support autonegotiation for identifying and selecting communication parameters such as speed and duplex mode.

The PHY device 110a and/or the PHY device 110b may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps. The PHY device 110a and/or the PHY device 110b may comprise a backplane PHY capable of operating at one or more standard rates such as 10 Gbps (10 GBASE-KX4 and/or 10 GBASE-KR); and/or non-standard rates such as 2.5 Gbps and 5 Gbps. The PHY device 110a and/or the PHY device 110b may comprise a optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The PHY device 110a and/or the PHY device 110b may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

In various embodiments of the invention, the PHY device 110a and/or the PHY device 110b may comprise suitable logic, circuitry, and/or code that may enable transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

The data transmitted and/or received by the PHY device 110a and/or the PHY device 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The hosts 106a and 106b may implement layer 3 and above, the MAC controllers 108a and 108b may implement layer 2 and above and the PHY device 110a and/or the PHY device 110b may implement the operability and/or functionality of layer 1 or the physical layer. In this regard, the PHY device 110a and/or the PHY device 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY device 110a and/or the PHY device 110b. During transmission, a device implementing a layer function may add its own header to the data passed on from the interfacing layer above it. However, during reception, a compatible device having a similar OSI stack may strip off the headers as the message passes from the lower layers up to the higher layers.

The PHY device 110a and/or the PHY device 110b may be configured to handle physical layer requirements, which include, but are not limited to, packetization, data transfer and serialization/deserialization (SERDES), in instances where such an operation is required. Data packets received by the PHY device 110a and/or the PHY device 110b from MAC controllers 108a and 108b, respectively, may include data and header information for each of the six functional layers above the PHY layer. The PHY device 110a and/or the PHY device 110b may be configured to encode data packets that are to be transmitted over the link 112 and/or to decode data packets received from the link 112.

In various embodiments of the invention, one or both of the PHY device 110a and the PHY device 110b, may comprise suitable logic, circuitry, interfaces, and/or code that may be configured and/or operable to implement one or more energy efficient Ethernet (EEE) techniques in accordance with IEEE 802.3az as well as other energy efficient network techniques. For example, the PHY device 110a and/or the PHY device 110b may be configured and/or operable to support low power idle (LPI) and/or sub-rating, also referred to as subset PHY, techniques. LPI may generally refer a family of techniques where, instead of transmitting conventional IDLE symbols during periods of inactivity, the PHY device 110a and/or the PHY device 110b may remain silent and/or communicate signals other than conventional IDLE symbols. Sub-rating, or sub-set PHY, may generally refer to a family of techniques where the PHYs are reconfigurable, in real-time or near real-time, to communicate at different data rates. In a sub-rate PHY mode, a network device may communicate at less than a negotiated maximum data rate. In a sub-set PHY mode, PHY circuitry that handles a portion of channels on a link may be silent and/or operating in a lower power mode.

In various embodiments of the invention, the hosts 106a and/or 106b may be configured and/or operable to communicate control information with the PHY devices 110a and/or 110b via an alternate path. For example, the host 106a and/or the host 106b may be configured and/or operable to communicate via a general purpose input output (GPIO) and/or a peripheral component interconnect express (PCI-E).

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standards, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. For example, the interface 114 may comprise a control interface such as a management data input/output (MDIO) interface. Furthermore, the interfaces 114a and 114b may comprise multi-rate capable interfaces and/or media independent interfaces (MII). For example, the interfaces 114a and/or 114b may comprise a media independent interface such as a XGMII, a GMII, or a RGMII for communicating data to and/or from the PHY device 110a. In this regard, the interface 114 may comprise a signal to indicate that data from the MAC controller 108a to the PHY device 110a is imminent on the interface 114a. Such a signal is referred to herein as a transmit enable (TX_EN) signal. Similarly, the interface 114a may utilize a signal to indicate that data from the PHY 110a to the MAC controller 108a is imminent on the interface 114a. Such a signal is referred to herein as a receive data valid (RX_DV) signal. The interfaces 114a and/or 114b may be configured to utilize a plurality of serial data lanes for sending and/or receiving data. The bus controller interfaces 116a and 116b may correspond to PCI or PCI-X interfaces. Notwithstanding, the invention is not limited in this regard.

In operation, one or both network devices 102 and 104 may be1 configured and/or operable to determine latency requirements for one or more packets that are pending delivery and may be configured and/or operable to preempt transmission of a packet in instances when one or more subsequent packets comprise more stringent constraints with regard to latency. In this regard, one or both of the network devices 102 and 104 may be configured and/or operable to parse and/or inspect packets for latency information. The packets may be marked with latency information, for example, in a L2 header, in a portion of the payload and/or in a preamble, for example. The marking of packets may be performed by an endpoint device, by a network core device or by any device along a communication path where the packet may be processed.

Packet preemption capabilities may be part of a standardized or non-standard protocol. Network devices may be configured and/or operable to determine whether another device is configured and/or operable to perform packet preemption. For example, packet preemption capabilities may be communicated during auto negotiation or as a L2 capability during link layer discovery. In instances when a network device determines that another network device does not comprise packet preemption capabilities, the first network device may remove packet preemption or latency markings from a packet prior to sending it to the other network device.

In an exemplary embodiment of the invention, the MAC 108a and/or PHY 110a may be in the process of transmitting a packet to the network device 104. The host device 106a may comprise a switch, for example, and may be configured and/or operable to compare latency requirements of the packet in transmission with latency requirements of one or more packets that may be pending delivery by the network device 102 to the network device 104. The host device 106a may determine that a second, and/or more packets have greater sensitivity to latency than the packet being transmitted. The host device 106a may communicate the second and/or additional packets to the MAC controller 108a. The MAC controller 108a may interrupt transmission of the first packet and may begin transmitting the second and/or more packets. In this manner, packets may be nested within one another for packet preemption.

Upon completion of transmission of the second and/or more packets, the MAC 108a may finish communicating the first packet to the network device 104. The network device 102 may insert delimiters within or between different packets and/or portions of packets to communicate how or where packet preemption occurs to the network device 104. In an exemplary embodiment of the invention, the network device 104 may receive a first segment of a first packet, followed by the second packet which may be followed by the second segment of the first packet. As a receiving link partner, the network device 104 may extract and/or store the received packets and/or packet segments. The network device 104 may reconstruct the first packet from the two segments of the packet that were separated by the second packet during transmission. In instances when the transmitting link partner may have a third packet or more packets that may be pending delivery that may have a higher sensitivity to latency than the first and/or second packets, the MAC 108a may preempt a packet currently undergoing transmission and may begin transmitting the third packet, for example. In this regard, the receiving link partner, for example, network device 104, may extract the received packets and/or packet segments and may reconstruct the first, second and/or third packets.

In an exemplary embodiment of the invention, the network device 102 may be in the process of transmitting, for example, a packet comprising data that may be associated with web browsing and/or may be tolerant of latency. The network device 102 may receive a VOIP packet and/or may determine that the VOIP packet requires lower latency for high quality and successful communication relative to the web browsing data. In this regard, the associated latency for the VoIP packet is less than the associated latency for the web browsing packet. The network device 102 may stop the process of transmitting the web related packet and may hold and/or store a portion of the packet that has not yet been transmitted. The network device 102 may begin transmission of the VOIP packet. When the VOIP packet transmission has ended, the network device 102 may transmit the remaining portion of the web related packet.

The network device 104 may receive the first portion of the web related packet followed by the VOIP packet followed by the second portion of the web related packet. The network device 104 may extract the VOIP packet and/or the portions of the web related packet and may reconstruct the VOIP and web related packets. In this regard, one or more of the PHY 110b, the MAC controller 108b and/or the host 106b in the network device 104 may comprise suitable logic, circuitry, interfaces and/or code that may be configured and/or operable to extract packet segments and/or reassemble or otherwise reconstruct packet segments.

Figure 2A:
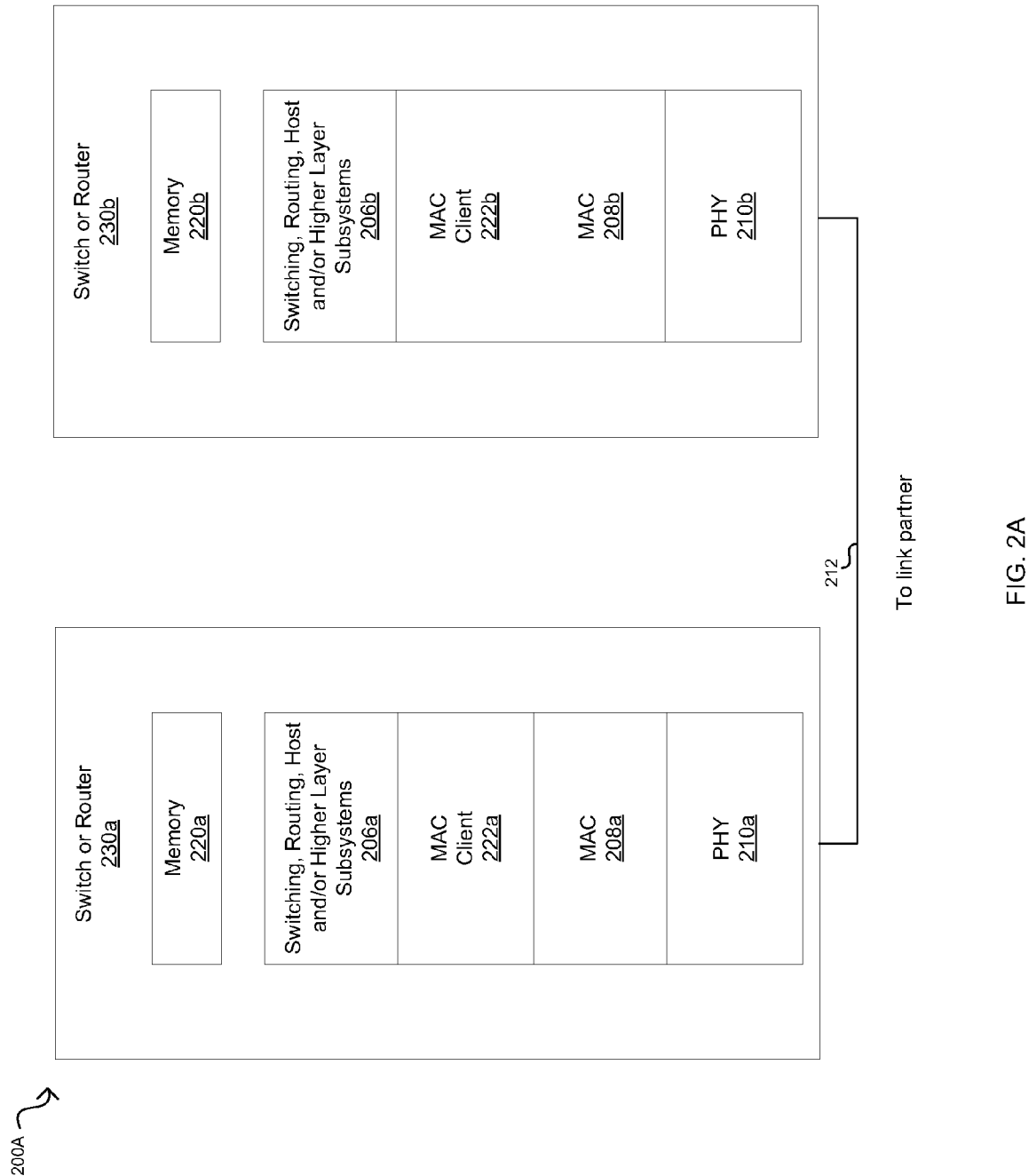
FIG. 2A is a block diagram illustrating an exemplary network device that is configured and/or operable to utilize packet preemption for packets requiring low latency, in accordance with an embodiment of the invention.

FIG. 2A is a block diagram illustrating exemplary network devices that are configured and/or operable to utilize packet preemption for packets requiring low latency, in accordance with an embodiment of the invention. Referring to FIG. 2A, there is shown a system 200A comprising network device 230a and 230b and a communication link 212. The network device 230a may comprise switching, routing, host and/or higher layer subsystems 206a, a MAC client 222a, a MAC controller 208a, a PHY device 210a and a memory 220a. The network device 230b may comprise switching, routing, host and/or higher layer subsystems 206b, a MAC client 222b, a MAC controller 208b, a PHY device 210b and a memory 220b.

The network device 230a and/or 230b may be similar or substantially the same as the network devices 102 and/or 104 described with respect to FIG. 1. The communication link 212 may be similar and/or substantially the same as the link 112. The switching, routing, host and/or higher layer subsystems 206a and 206b, the MAC controllers 208a and 208b and the PHY devices 210a and 210b may be similar and/or substantially the same as the hosts 106a and/or 106b, the MAC controllers 108a and 108b and/or the PHY devices 110a and/or 110b respectively.

The MAC client blocks 222a and/or 222b may comprise suitable logic, circuitry, interfaces and/or code that may be configured and/or operable to receive packet data from the switching, routing, host and/or higher layer subsystems 206a and/or 206b and/or to encapsulate the packet data as Ethernet payloads into one or more Ethernet frames. The Ethernet frames may be communicated from the MAC client block 222a to the MAC controller 208a. In this regard, the MAC client 222a may be configured and/or operable to handle generating header information for packets that may be preempted so that packets comprising more stringent latency requirements may be communicated to a link partner before packets with a greater tolerance for latency. For example, the MAC client block 222a may process a first packet for transmission to a link partner, for example, the network device 230b. The MAC client 222a may receive a second packet that may require lower latency than the first packet. The MAC client 222a may stop processing the first packet and may generate a packet header for the second packet that may comprise data that may indicate the second packet is being transmitted prior to the end of the first packet. Once the second packet has been communicated, the MAC client 222 may generate a packet header to indicate that the second packet has ended and that the remaining portion of the second packet is being transmitted to the link partner.

The memory 220a and/or 220b may comprise suitable logic, circuitry, interfaces and/or code that may be configured and/or operable to store packet data and/or packet information, for example, packet header information. In this regard, when the network device 230a may be transmitting packets, the memory 220a may comprise an egress queue for the network device 230a that may hold packet data during a preemption process. In instances when transmission of a packet may be interrupted prior to completion of transmission of the entire packet, a portion of the packet that has not been transmitted yet may be stored in the memory 220a until a time instant when transmission of the packet may resume. In instances when a link partner, for example the network device 230b, may be receiving one or more packets that have been preempted by a second packet, the memory 220b may be utilized to store packets and/or portions of packets until the packets may be reconstructed. The memories 220a and/or 220b may comprise an index and/or link list, for example, of packet headers, which may comprise pointers that correspond to packet data and/or packet information stored in the memories 220a and/or 220b. Moreover, the memories 220a and/or 220b may comprise content addressable memory (CAM) that may enable modification of stored information base on a type of content within the memory. For example, control data and/or packet header information that may correspond to a stored packet and/or a portion of a packet may be stored in CAM.

In operation, the network devices 230a and/or 230b may be configured and/or operable to transmit and/or receive packets utilizing packet preemption. Furthermore, the network device 230a and/or 230b may be configured and/or operable to receive packets and/or portions of packets that may be received in segments wherein the segments may be separated by other packets and/or segments of other packets and may reconstruct packets from the segments. In this regard, utilization of packet preemption may be determined based on latency requirements of packet data that may be pending delivery. In instances when the network device 230a is transmitting a first packet and determines that a second packet may have a lower tolerance for latency than the first packet, the network device 230a may interrupt transmission of the first packet prior to completion of transmission of the entire first packet and/or may store a portion or segment of the packet that has not yet been transmitted. In this regard, the packet segment and/or information about the packet segment may be stored in an egress buffer in memory 220a. The network device 230a may transmit the second packet prior to resuming transmission of the remaining portion and/or segment of the first packet.

The switching, routing, host and/or higher layer subsystems 206a and/or 206b may determine latency requirements and/or service class based on inspection of one or more packets. For example, markings that may indicate latency requirements and/or service class may be inserted in the packet and may be read by the switching, routing, host and/or higher layer subsystems 206a and/or 206b. For example, latency requirements may depend on an application that generates the packet and/or on a capability of a device that generated and/or may render the packet. Alternatively, OSI layer 2 packet headers, payload and/or a preamble may be inspected to provide an indication of latency requirements, for example, based on a type of data within the packet. Based on the determined latency requirements, the switching, routing, host and/or higher layer subsystems 206a and/or 206b may determine that packet preemption should be utilized. The MAC clients 222a and/or 222b may generate packet preemption delimiters that may indicate when a packet is preempted and/or that may provide information that may enable a receiving network device to reassemble or otherwise reconstruct the segmented packets.

In instances when the network device 230b may be receiving preempted packets and/or packet segments with embedded lower latency packets, the reconstruction of the packet segments may be performed at one or more of the PHY device 210b, the MAC controller 208b, the MAC client 222b and/or the switching, routing, host and/or higher layer subsystems 206b. In this manner, a packet requiring the lowest latency may be transmitted and received as soon as possible. A network device 230a may be in the process of transmitting a first packet to a link partner and a second packet requiring a lower latency may be ready for transmission. The network device 230a may not wait for the transmission of the first packet to end before communicating the packet requiring a lower latency.

Figure 2B:
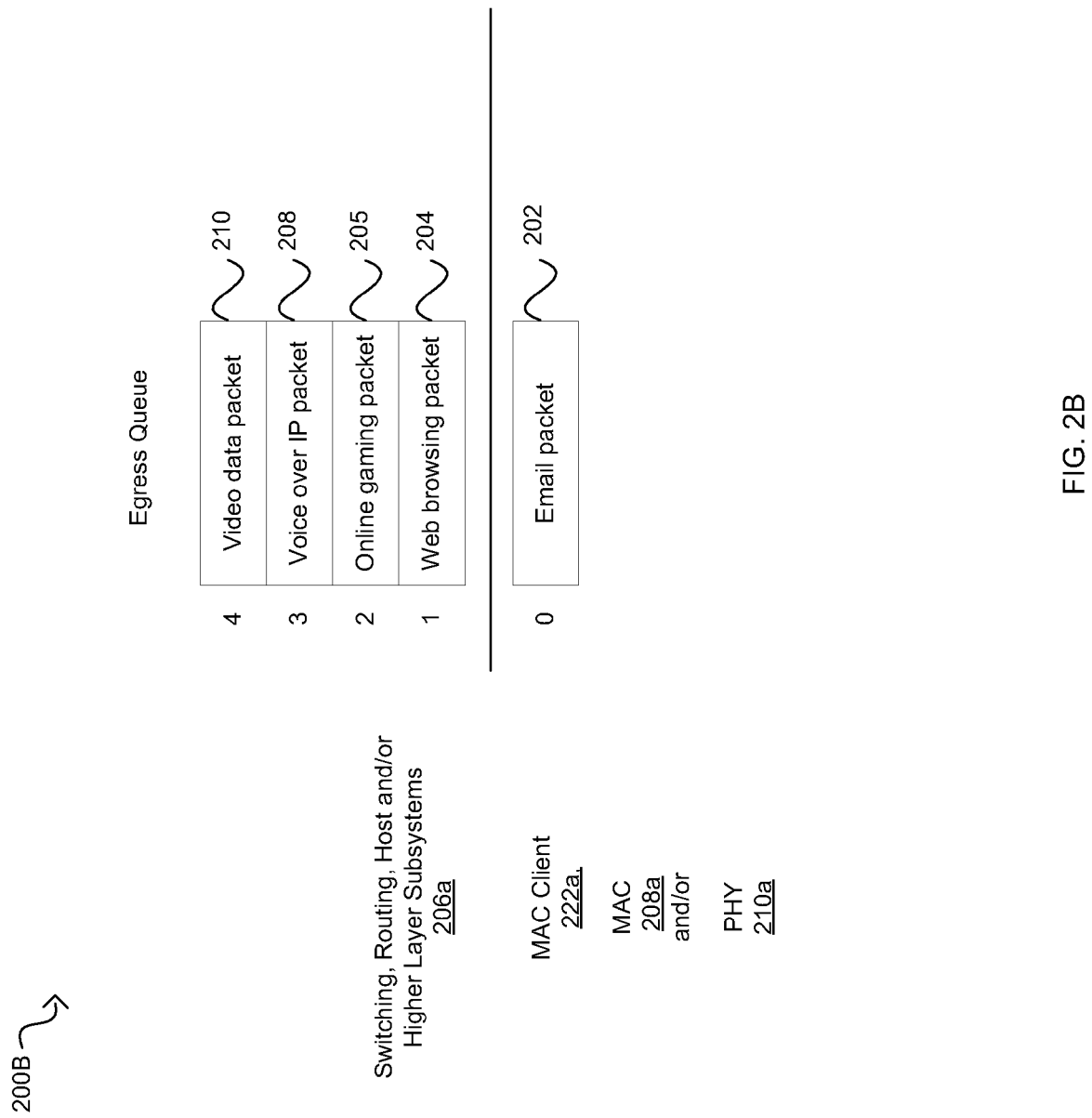
FIG. 2B is a block diagram illustrating an exemplary egress queue that may comprise latency information utilized for packet preemption, in accordance with an embodiment of the invention.

FIG. 2B is a block diagram illustrating an exemplary egress queue that may comprise latency information utilized for packet preemption, in accordance with an embodiment of the invention. Referring to FIG. 2B, there is shown an egress queue 200B, the switching, routing, host and/or higher layer subsystems 206a, the MAC client 220a, the MAC 208a, the PHY 210a and an egress queue comprising a plurality of storage locations 202, 204, 205, 208 and/or 210.

The egress queue 200B comprising the storage locations 202, 204, 205, 208 and/or 210 may comprise a portion of the memory 220a in the switch and/or router 230a described with respect to FIG. 2A. In operation, the network device 230a may be configured and/or operable to store and/or index packets and/or packet information in the egress queue 200B. The MAC client 220a may be in the process of transmitting a first packet stored in the memory location 202 to a link partner, for example, the network device 230b. The network device 230a may determine that another packet stored in the egress queue may have higher priority for transmission than the first packet that is currently being transmitted from memory location 202. For example, the switching, routing, host and/or higher layer subsystems 206a may comprise suitable logic, circuitry, interfaces and/or code that may be configured and/or operable to inspect markers comprising latency requirements, for example, in one or more packets stored in the storage locations 202, 204, 205, 208 and/or 210 for example.

The switching, routing, host and/or higher layer subsystems 206a may be configured and/or operable to determine that a second packet, for example, a packet stored in the storage location 205 may require less latency than the first packet that is currently being transmitted and may interrupt transmission of the first packet after only a first portion of the first packet is transmitted. In this regard, a packet delimiter may be inserted between the first portion of the first packet and the second packet from the storage location 205. The network device 230a may transmit the second packet and may insert another preemption delimiter after transmission of the second packet. The network device 230a may resume transmitting the first packet. In various embodiments of the invention, a third packet may preempt the second packet, for example, in instances when the switching, routing, host and/or higher layer subsystems 206a determines that the third packet has priority over the second packet.

FIG. 3A is a block diagram illustrating an exemplary first packet that may be transmitted by a network device and/or may be preempted, in accordance with an embodiment of the invention. Referring to FIG. 3A, there is shown a packet 300 that may comprise a start of a packet header 302, a MAC source address header (MAC SAH) 304, a MAC destination address header (MAC DAH) 306, a payload 308, and an end of packet header 310.

The start of packet header 302 may indicate to a receiving network device, for example the network device 230b, where the packet 300 begins. The MAC SAH 304 may indicate which network device is transmitting the packet 300 and the MAC DAH 306 may indicate which device is receiving the packet 300. The payload 308 may comprise packet data and/or headers for higher layer processing. The payload 308 may be associated with a level of latency that may be desired for an acceptable quality of communication. In this regard, the packet 300 may be marked with a latency specification. For example, the payload 308 may comprise data utilized in web browsing that may be somewhat tolerant to latency. The end of packet 310 may indicate to a receiving device 230b where the packet 300 ends.

In operation, the network device 230a may begin transmitting the packet 300 to the network device 230b via the PHY 210b. The network device 230a may receive a second packet for transmission via the PHY device 210b. The network device 210b may inspect the second packet to determine a specified latency for delivery of the second packet. In instances when information within the second packet indicates that the second packet has less time to reach its destination than the first packet 300, transmission of the first packet 300 may be interrupted and the remaining portion and/or segment of the first packet 300 may be stored within the memory 222a. The MAC client 222a may generate a header for the end of the first portion and/or first segment of the first packet 300 and/or may generate a header to indicate that the first packet 300 has been preempted and transmission of a second packet has begun.

The MAC client 222a may be configured and/or operable to generate a header for the end of the second packet and/or the beginning of the second portion and/or second segment of the first packet 300. The network device 230a may transmit the second packet prior to communicating the remaining portion and/or segment of the first packet 300.

In a similar manner, when the second packet that has preempted the first packet 300 is being transmitted and a third packet with a more stringent latency requirement or a higher priority than the first packet 300 and the second packet becomes available for delivery, the second packet may be preempted. In this regard, transmission of the second packet may be interrupted and the third packet may be transmitted. After the third packet is transmitted, the second packet may continue transmission. After the second packet is transmitted the first packet may continue transmission. In this manner any suitable number of packet preemptions may be nested and/or chained in a sequence prior to completing transmission of the first packet.

Figure 3B:
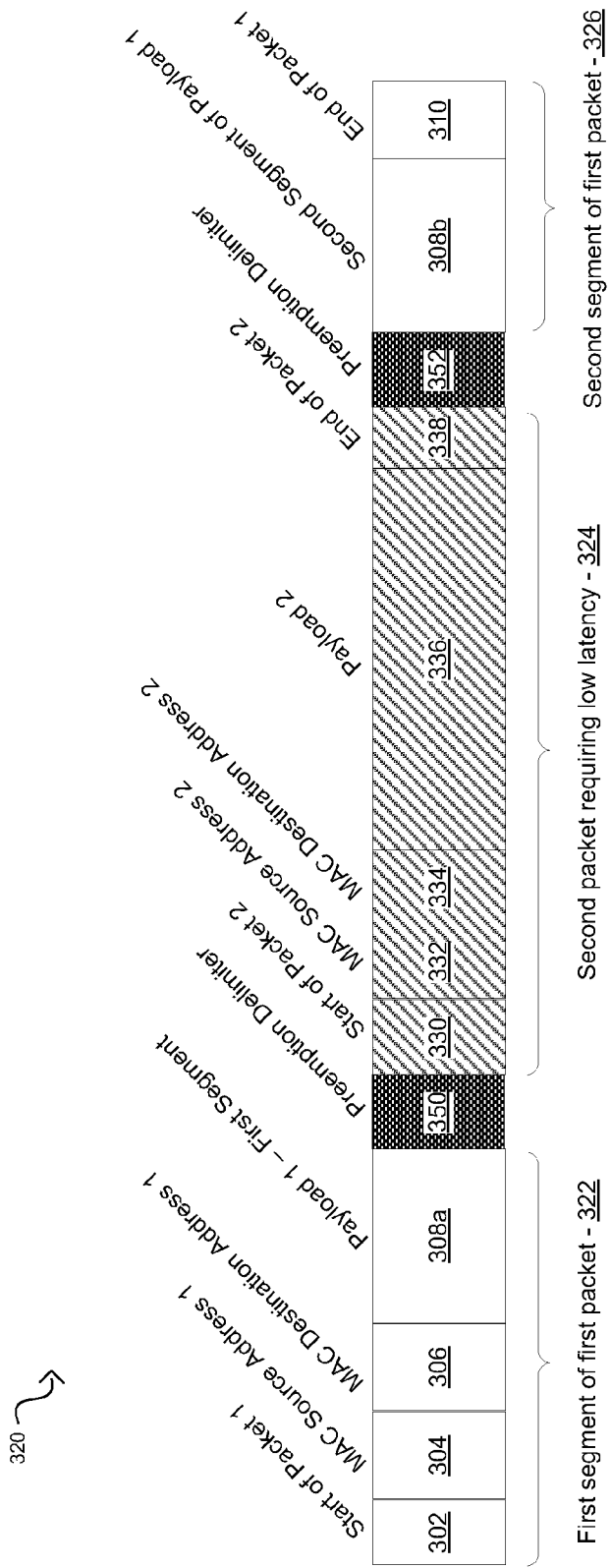
FIG. 3B is a block diagram illustrating an exemplary first packet preempted by a second packet, in accordance with an embodiment of the invention.

FIG. 3B is a block diagram illustrating an exemplary first packet preempted by a second packet, in accordance with an embodiment of the invention. Referring to FIG. 3B, there is shown a plurality of packets 320 that may comprise a first segment of a first packet 322, a second packet 324 and a second segment of the first packet 326. The first segment of the first packet 322 may comprise the start of packet header 302, the MAC source address header (MAC SAH) 304, the MAC destination address header (MAC DAH) 306 and a first portion of the payload 308 indicated by 308a. In addition, the second packet 324 may comprise a start of packet header 330, a MAC SAH 332, a MAC DAH 334, a payload 336 and an end of packet header 338. The second segment of the first packet 326 may comprise a second portion of the payload 308 indicated by 308b and an end of packet header 310. There is also shown a preemption delimiter 350 and a preemption delimiter 352.

The plurality of packets 320 may illustrate an order for transmitting packets and/or portions of and/or segments of packets utilizing preemption for low latency packets described with respect to FIG. 1 and/or FIG. 2. The first segment of the first packet 322 and the second segment of the first packet 326 may comprise the packet 300 as described with respect to FIG. 3A.

The second packet 324 may comprise the start of packet header 330, a MAC SAH 332, a MAC DAH 334 and an end of packet header 338 that may be similar to the start of packet header 302, the MAC SAH 304, the MAC DAH 306 and the end of packet header 310 respectively, described with respect to FIG. 3A. The payload 336 may be associated with a specified level of latency that may be desired for communicating the second packet 324 with an acceptable quality or performance. In this regard, the second packet 324 may be marked with a latency specification for data that may be utilized for low latency applications such as voice over IP (VOIP) or online gaming. Therefore, the second packet 324 may require an end to end low latency for good quality voice communication. The second packet 324 may be nested between the segments 322 and 326 of the first packet 300. In various embodiments of the invention, similar mechanisms may be utilized to nest a third higher priority packet within the second packet 324, for example.

The preemption delimiters 350 and/or 352 may indicate where one packet is preempted by another packet and/or where preemption may be complete and transmission of a remaining portion of the preempted packet may resume. Any suitable technique may be utilized to generate the preemption delimiters 350 and/or 352. For example, reserved code groups, special characters, a modified idle pattern, reserved bits in an LDPC frame and/or control characters may be utilized. In various embodiments of the invention, a mini packet segment may be communicated to indicate which packet is preempted. The preemption delimiters may be inserted in a packet preamble, a packet header and/or near the beginning of a layer 2 payload, for example. The preemption delimiters 350 and/or 352 may comprise information that may enable a network device, for example, the network device 230b, to receive the plurality of packets 320, to extract data from one or more different packets and to reconstruct the packets prior to further processing and/or communication to another device. In this regard, the preemption delimiter 350 may comprise information that may identify the first packet 300 and/or information that may indicate that a break has occurred in the transmission of the first packet 300. The preemption delimiter 352 may comprise information that may identify the first packet 300 and/or may indicate that a second portion or segment of the first packet 326 is beginning. In various embodiments of the invention, the preemption delimiter 352 may indicate whether the second segment of the first packet 323 is the final segment of the first packet.

In operation, a network device, for example, the network device 230a, may begin transmitting the first packet 300, however, the network device 230a may determine that the second packet 324 may be sent prior to completion of transmission of the packet 300. In this regard, the network device 230a may transmit the first segment of the first packet 322 followed by the second packet 324, followed by the second segment of the first packet 326. In addition, the network device 230a may insert the preemption delimiter 350 prior to sending the second packet 324 and/or the preemption delimiter 352 prior to sending the second portion of the first packet 324. The plurality of packets 320 may be received by a link partner, for example, the network device 230b that may be configured and/or operable to parse and/or extract packet data from the plurality of packets 320 and may be configured and/or operable to reconstruct data from the first packet 300 and/or the second packet 324. Although the delimiter 350 is shown within the payload 308a, the invention is not so limited. In this regard, preemption may occur during transmission of a header for example, and a delimiter may be inserted within the header.

FIG. 3C is a block diagram illustrating exemplary packets that have been parsed, extracted and/or reconstructed from a plurality of preempted and/or nested packets and/or packet segments, in accordance with an embodiment of the invention. Referring to FIG. 3C, there is shown a first reconstructed packet 360 and a second reconstructed packet 370. The first reconstructed packet 360 may comprise the start of a packet header 302, the MAC source address header (MAC SAH) 304, the MAC destination address header (MAC DAH) 306, the payload data 308a and 308b, and the end of packet header 310. The second reconstructed packet 370 may comprise the start of packet header 330, the MAC SAH 332, the MAC DAH 334, the payload 336 and the end of packet header 338.

The first reconstructed packet 360 may comprise packet data that may be extracted from the plurality of packets 320 by a receiving network device, for example, the network device 230b. In this regard, the receiving network device 230b may extract the first segment of the first packet 322 and the second segment of the first packet 326 and may assemble the data into a single packet. Accordingly, the reconstructed packet 360 may comprise the same data and/or same payload data as the first packet 300 described with respect to FIG. 3A.

The second reconstructed packet 370 may also comprise packet data that may be parsed and/or extracted from the plurality of packets 320 by the receiving network device 230b. In this regard, the reconstructed packet 370 may comprise the same data and/or same payload data as the second packet 324 described with respect to FIG. 3B.

In operation, a network device, for example, the network device 230b may receive the plurality of packets 320. The network device 230b may utilize the preemption delimiters 350 and/or 352 described with respect to FIG. 3B to parse the plurality of packets 320 and/or to extract and/or reconstruct the first segment of the first packet 322, the second packet 324 and/or the second segment of the first packet 326. The receiving network device 230b may construct the first packet 360 and the second packet 370 from the parsed and/or extracted packet data.

Figure 4:
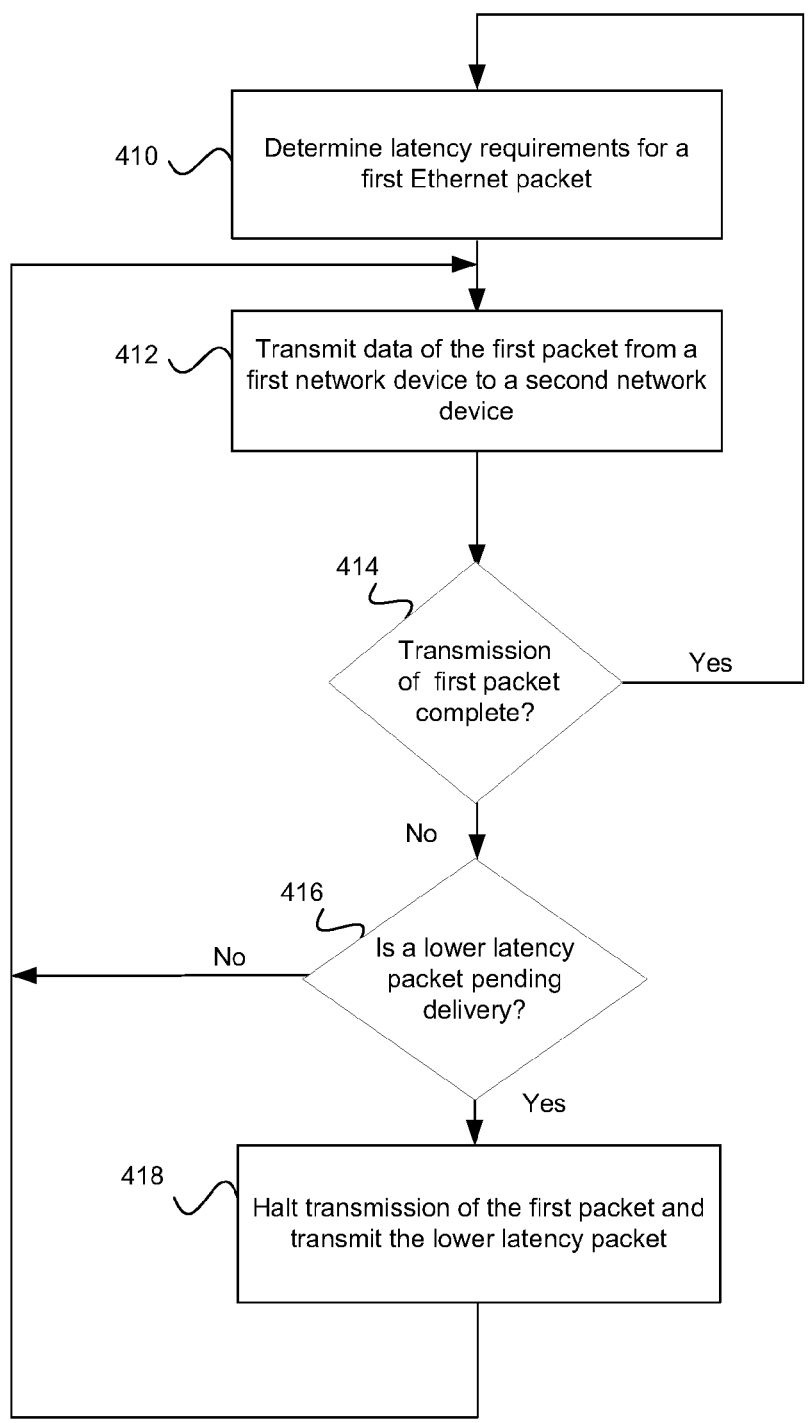
FIG. 4 is a flow chart illustrating exemplary steps for preempting transmission of a first packet when a second packet comprising lower latency requirements than the first packet is available for delivery to a link partner, in accordance with an embodiment of the invention.

FIG. 4 is a flow chart illustrating exemplary steps for preempting transmission of a first packet when a second packet comprising lower latency requirements than the first packet is available for delivery to a link partner, in accordance with an embodiment of the invention. Referring to FIG. 4, the exemplary steps may begin with step 410. In step 410, latency requirements may be determined for a first packet that may be awaiting transmission via a specified port of the network device 230a, for example, via the PHY 210. In step 412, the network device 230a may transmit data of the first packet to a second network device, for example, the network device 230b. In step 414, in instances when the network device 230a has not completed the process of transmitting the first packet, the exemplary steps may proceed to step 416. In step 416, in instances when a lower latency packet is available for delivery via the PHY 210, the exemplary steps may proceed to step 418. In step 418, transmission of the first packet may be suspended or interrupted and the network device 230a may transmit the lower latency packet. The exemplary steps may proceed to step 412. In step 414, in instances when the network device 230a may have completed transmission of the first packet, the exemplary steps may proceed to step 410. In step 416, in instances when there is no packet available with lower latency requirements than the first packet, the exemplary steps may proceed to step 412.

Figure 5A:
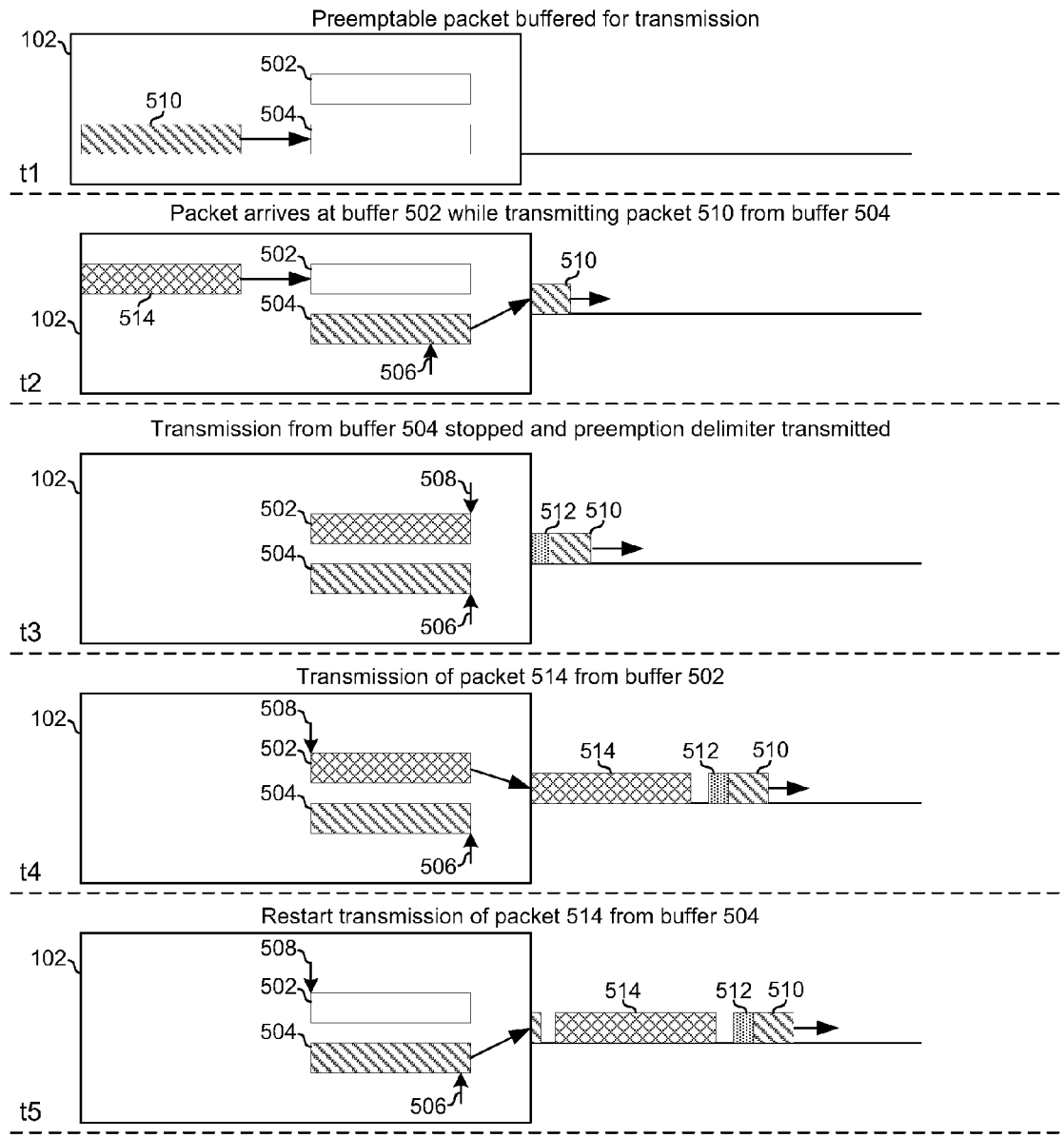
FIG. 5A is a diagram illustrating preempting and restarting transmission of a packet in a transmitting device, in accordance with an embodiment of the invention.

FIG. 5A is a diagram illustrating preempting and restarting transmission of a packet in a transmitting device, in accordance with an embodiment of the invention. Referring to FIG. 5A, the device 102 may comprise buffers 502 and 504 which may be allocated for storing data to be transmitted onto the link 112. The buffers 502 may reside in memory in the host 106a, the MAC 108a, or the PHY 110a. The buffers 502 and 504 may be physically separate buffers or may be logical buffers in the same memory. The buffer 504 may be allocated for storing low-priority packets. The buffer 502 may be allocated for storing high-priority packets. As utilized herein, "low-priority packets" means packets having lower priority than the high-priority packets and, similarly, "high-priority packets" means packets having higher priority than the low-priority packets. Accordingly, transmission from the buffer 504 that stores low-priority packets (the "low-priority buffer") may be preempted when there is traffic to be transmitted stored in the buffer 502 that stores high-priority packets (the "high-priority buffer"). Although two buffers corresponding to two priorities are shown for illustration, the invention is not so limited. In this regard, for example, three or more buffers may store a corresponding three or more priorities where packets from one buffer may preempt traffic from any other buffer(s) having lower priority.

The exemplary sequence of events depicted in FIG. 5A may begin at time instant t1 with a low-priority packet 510 being stored in buffer 504. At time instant t2 the device 102 may be transmitting the packet 510 onto the link when a high-priority packet 514 may arrive at the buffer 502. At time instant t3, upon detecting the high-priority packet 514 in the buffer 502, the device 102 may stop transmitting the packet 510. The transmission of the packet 510 may, for example, be stopped immediately or may cease upon reaching a next suitable stopping point of the packet 510. As part of ceasing transmission from the buffer 504 and/or prior to beginning transmission from the buffer 502, the device 502 may transmit a preemption delimiter 512. In an embodiment of the invention, the delimiter 512 may force a transmit error detection by the receiving device. For example, the last one or more bits of the packet 510 transmitted by the device 102 before the preemption takes effect may be inverted or otherwise intentionally corrupted to generate the delimiter 512.

After transmitting the delimiter 512, the device 102 may transmit the packet 514. After completing transmission of the packet 514, transmission of the packet 510 may begin at time instant t5. The portion of packet 510 which had already been transmitted may be retransmitted followed by the rest of the packet 510. In some instances, the packet 510 may be preempted again if another high-priority packet arrives in the buffer 502. In an exemplary embodiment of the invention, the number of times a particular packet may be preempted may be a preemption limit, a value of which may be configured by a network administrator and/or dynamically determined utilizing network statistics.

Figure 5B:
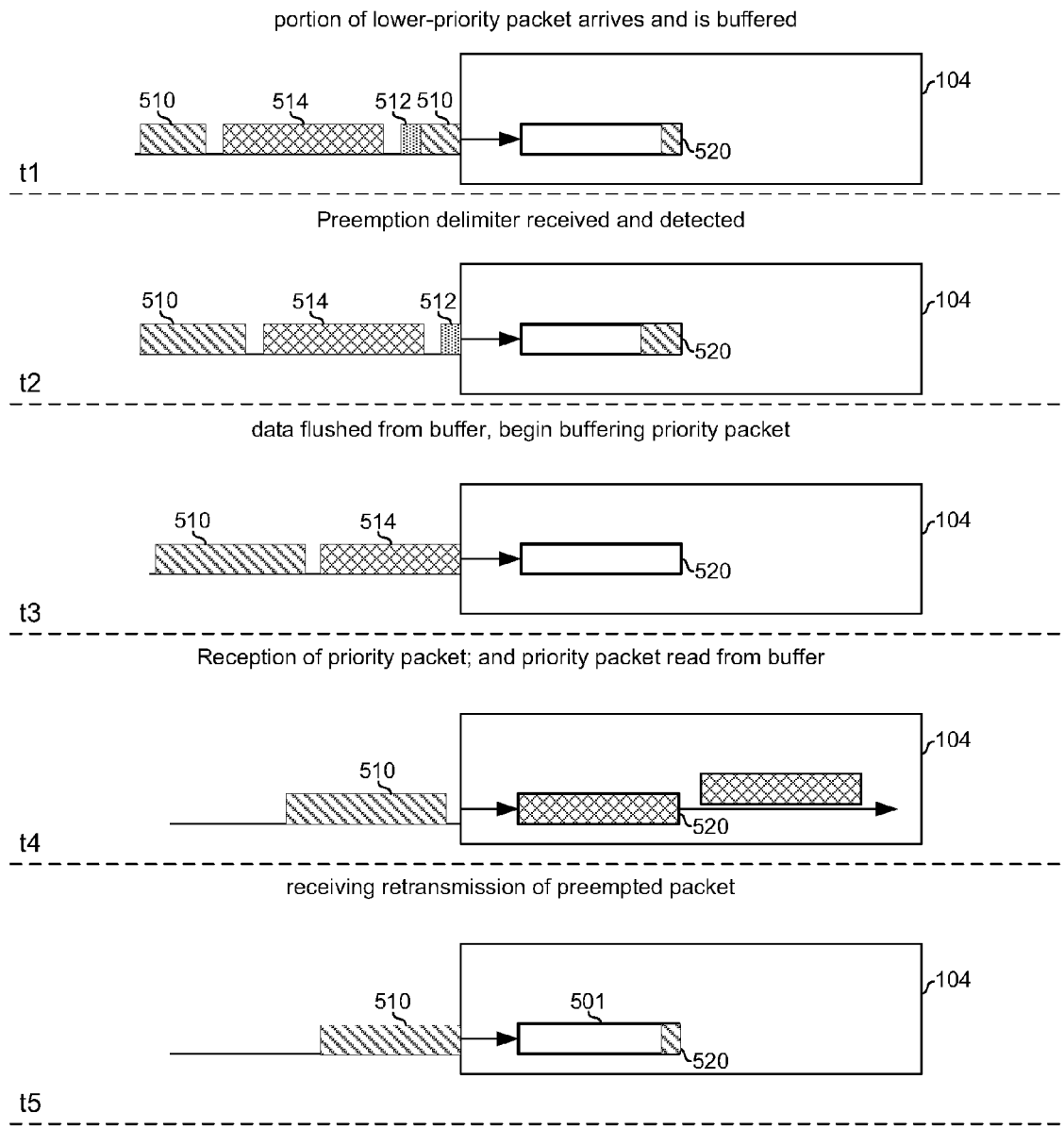
FIG. 5B is a diagram illustrating receipt of a preempted and restarted packet, in accordance with an embodiment of the invention.

FIG. 5B is a diagram illustrating receipt of a preempted and restarted packet, in accordance with an embodiment of the invention. Referring to FIG. 5B, the device 104 may comprise buffer 520 which may store data received via the link 112. The buffer 520 may reside in memory in the host 106b, the MAC 108b, or the PHY 110b.

At time t1 the device 104 may be receiving and buffering packet 510. In some instances, headers and/or other control information associated with the packet 510 may be stored in the buffer 510 along with the payload of the packet 510. At time t2 the delimiter 512 may be detected by the receiver 104. In response to detecting the delimiter buffer 512, the device 104 may, at time t3, flush the buffer 520. From time instant t3 to time instant t4 the packet 514 may be received and stored in buffer 520. At time instant t4, reception of the packet 514 may complete, and the packet may be read out of the buffer 520 for processing and/or forwarding. At time instant t5, retransmitted packet 510 may begin arriving at the device 104 and the device 104 may begin buffering it in the buffer 520.

Figure 6A:
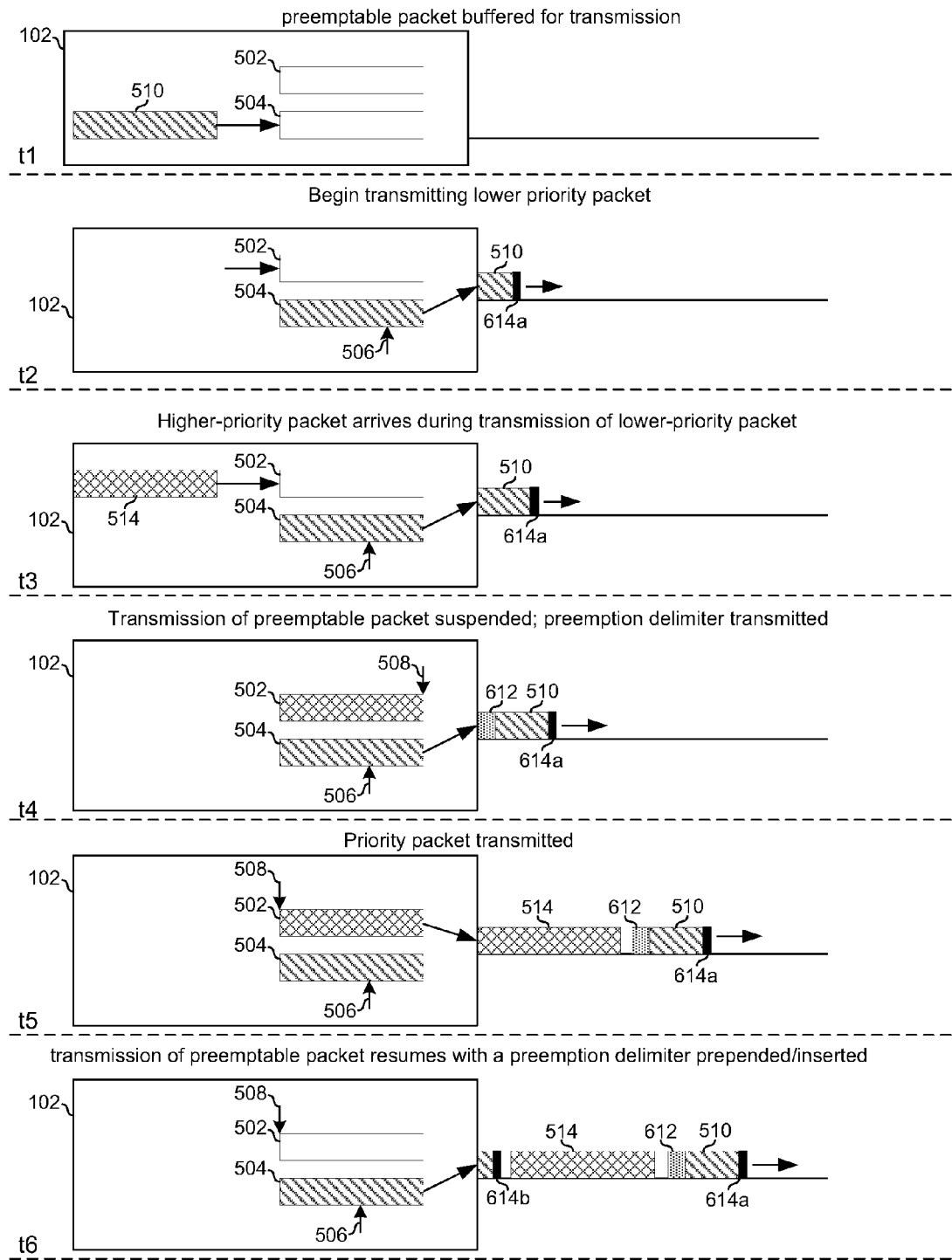
FIG. 6A is a diagram illustrating preempting and resuming transmission of a packet in a transmitting device, in accordance with an embodiment of the invention.

FIG. 6A is a diagram illustrating preempting and resuming transmission of a packet in a transmitting device, in accordance with an embodiment of the invention. Referring to FIG. 6A, the device 102 may comprise buffers 502 and 504 which may store data to be transmitted onto the link 112. The buffers 502 may reside in memory in the host 106a, the MAC 108a, or the PHY 110a. The buffers 502 and 504 may be physically separate buffers or may be logical buffers in the same memory. The buffer 504 may be allocated for storing low-priority packets. The buffer 502 may be allocated for storing high-priority packets. Accordingly, transmission from the low-priority buffer 504 may be preempted when there is traffic, which is stored in the buffer 502, to be transmitted. Although two buffers corresponding to two priorities are shown for illustration, the invention is not so limited. For example, three or more buffers may store a corresponding three or more priorities where packets from one buffer may preempt traffic from any buffers having lower priority.

The exemplary sequence of events depicted in FIG. 6A may begin at time instant t1 with a low-priority packet 510 being stored in buffer 504. At time instant t2, the device 102 may begin transmitting the packet 510. In various embodiments of the invention, the device 102 may mark the packet 510 to indicate that the packet is originating from a low-priority buffer. This marking may, for example, be in a field 614a within the packet 510. In an embodiment of the invention, the field 614a may be part of a fragmentation header as described below with respect to FIG. 7.

At time instant t3, while transmitting the packet 510, a high-priority packet 514 may be stored in the buffer 502. At time instant t4, upon detecting that the high-priority packet 514 is ready to be transmitted from the buffer 502, the device 102 may stop transmitting the packet 510. The transmission of the packet 510 may, for example, be stopped immediately or may cease upon reaching a next suitable stopping point of the packet 510. As part of ceasing transmission from the buffer 504 and/or prior to beginning transmission from the buffer 502, the device 502 may transmit a preemption delimiter 512. In an embodiment of the invention, the delimiter 512 may comprise a checksum or other validation data which may be utilized by the receiver to validate the portions of the packet 510 transmitted prior to packet 514 preempting it on the link.

After transmitting the delimiter 512, the device 102 may transmit the packet 514. After completing transmission of the packet 514, transmission of the packet 510 may resume at time instant t6. Transmission of the packet 510 may resume with the pointer 506 where it was at the time of preemption. In this manner, bandwidth may be conserved by avoiding the retransmission of the portions of the packet 510 transmitted prior to preemption. In various embodiments of the invention, the device 102 may mark the packet 510 to indicate that the packet is resuming after having been preempted. This marking may, for example, be in the form a field 614b inserted in the packet 510. In an embodiment of the invention, the field 614b may be part of a fragmentation header as described below with respect to FIG. 7.

Figure 6B:
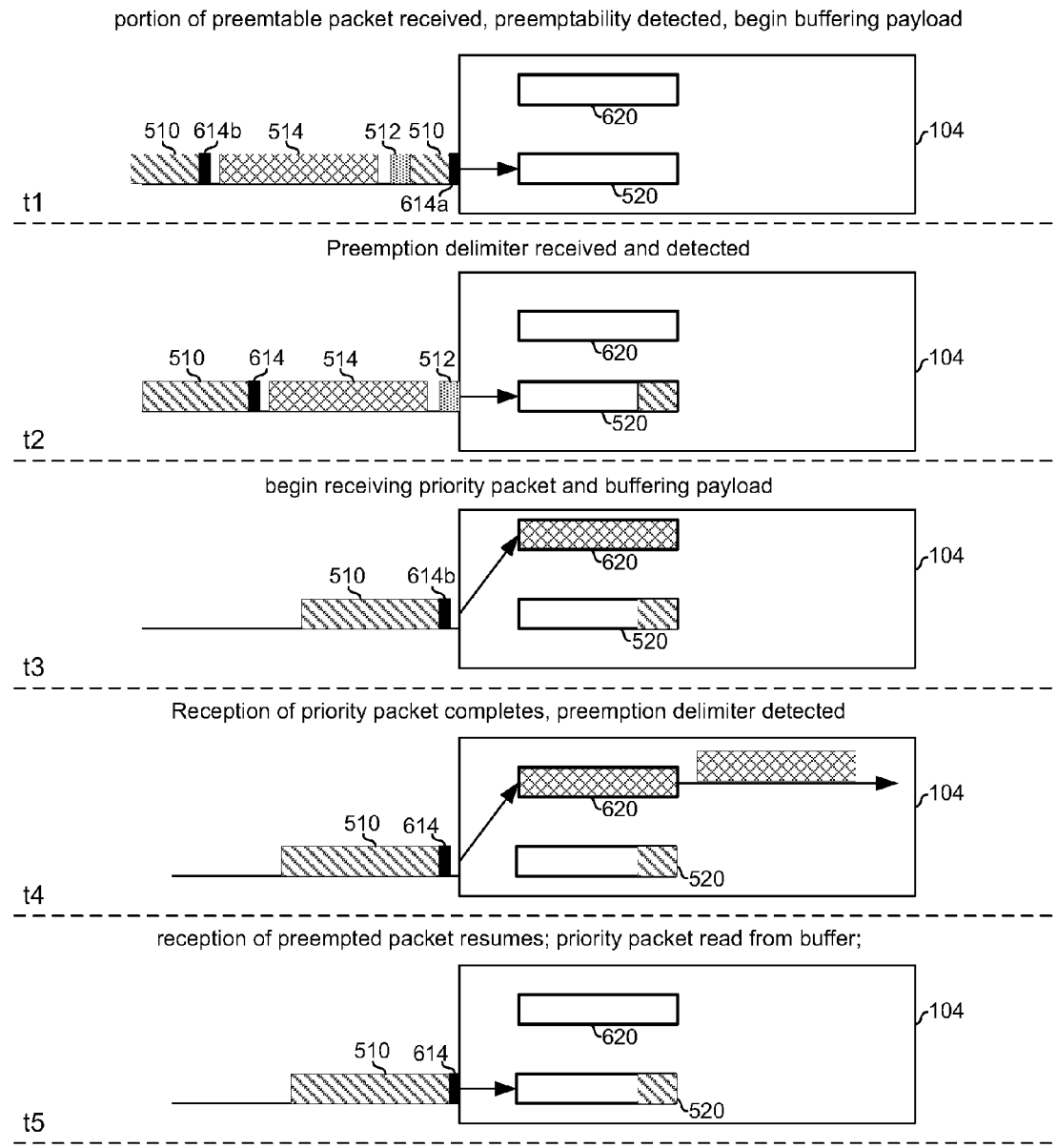
FIG. 6B is a diagram illustrating receipt of a preempted and resumed packet, in accordance with an embodiment of the invention.

FIG. 6B is a diagram illustrating receipt of a preempted and resumed packet, in accordance with an embodiment of the invention. Referring to FIG. 6B, the device 104 may comprise buffers 520 and 620 which may store data to be transmitted onto the link 112. The buffers 520 and 620 may reside in memory in the host 106b, the MAC 108b, or the PHY 110b. The buffers 520 and 620 may be physically separate buffers or may be logical buffers in the same memory.

At time instant t1 the device 104 may begin receiving the packet 510. Based on the field 614a, the device 104 may determine that the packet 510 is a low-priority packet which may be preempted. The device 104 may begin buffering the packet 510 in buffer 520. At time instant t2, the device may detect the delimiter 512. The device 104 may utilize information in the delimiter to validate the portion of the packet 510 received up to that point. The delimiter 512 may also indicate to that a preemption event has occurred and that the device 104 should expect to begin receiving a different packet.

From time instant t2 to time instant t3, the device 104 may receive the packet 514 and buffer it in buffer 620. At time instant t3, reception of packet 514 may complete, and the packet may be read out of the buffer 620 for processing and/or forwarding. At time instant t5 the remaining portion of packet 510 may arrive at the device 104. The device 104 may identify the packet as being the remaining portion of packet 510 based on the field 614b. Accordingly, the device may append it to the already-received portion, which is stored in buffer 520.

Figure 7A:
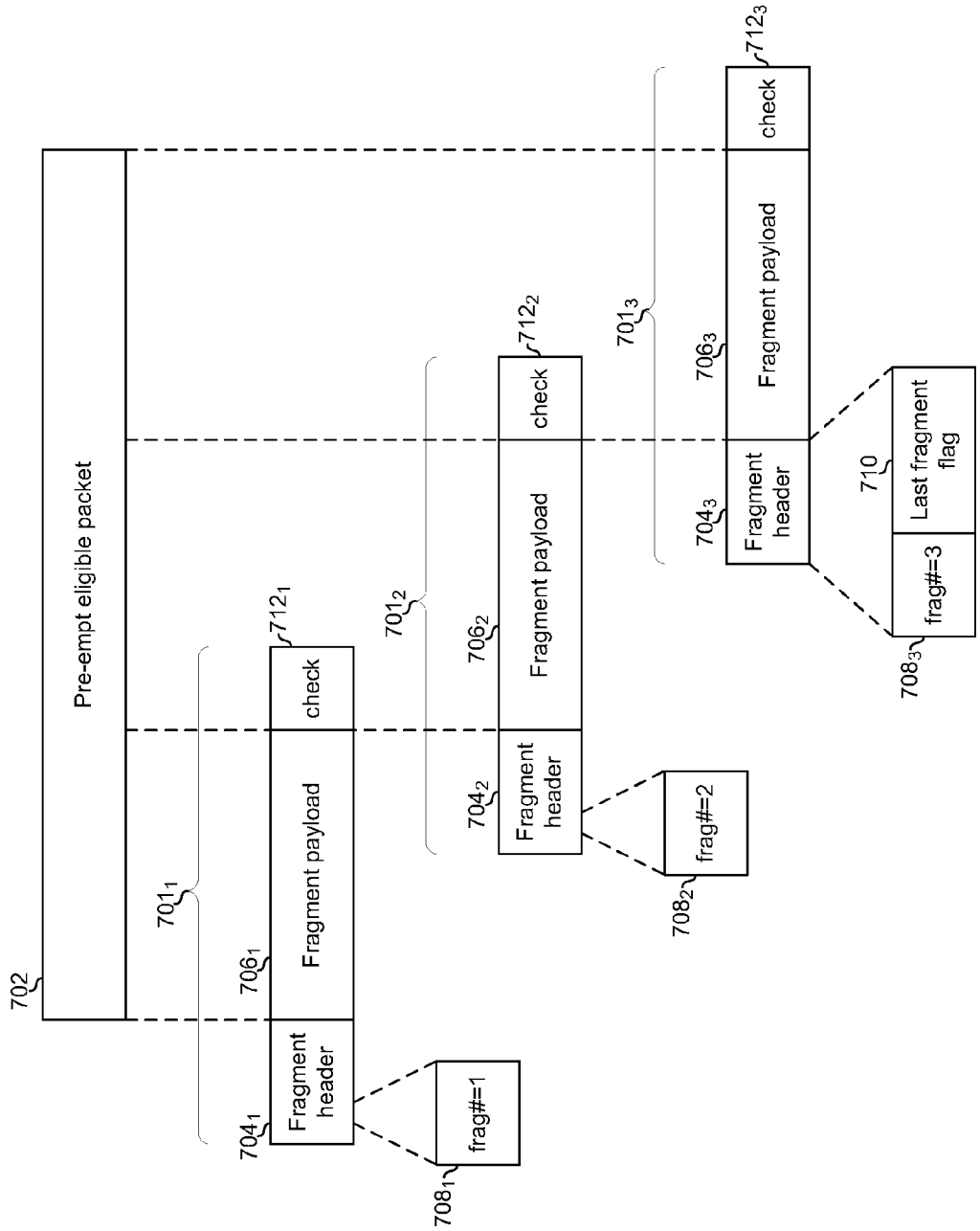
FIG. 7A is a diagram illustrating fragmentation to enable preemption, in accordance with an embodiment of the invention.

FIG. 7A is a diagram illustrating fragmentation to enable preemption, in accordance with an embodiment of the invention. Referring to FIG. 7A, there is shown a packet 702 and a plurality of fragments 701 generated from the packet 702. Each of the fragments may comprise a payload 706 containing bits of the packet 702 and may comprise a header 704 which may comprise information which may enable a receiver to properly receive the packet when a preemption event occurs. In an embodiment of the invention, the packet 702 may correspond to one or more packets arriving at the MAC 108a and fragmentation may take place in the MAC 108a. In an embodiment of the invention, the packet 702 may correspond to one or more packets arriving at the PHY 110a and fragmentation may take place in the PHY 110a.

The fragment headers 704 may enable a receiver to determine the proper order of the fragments, and to determine whether one or more fragments were lost in transit. For example, each fragment header 704 may comprise a number that indicates its position in the sequence of fragments 701 associated with the packet 702. The sequence number of each successive fragment of the packet 702 may be one higher than the previous fragment of the packet 702.

The header $704_1$ may comprise an indication that the fragment $701_1$ is the first fragment of the packet 702. For example, a sequence number of 0 or 1 or any other initial value agreed to by the transceiver and receiver may indicate that the fragment $701_1$ is the first fragment of the packet 702.

The header $704_3$ may comprise an indication that the fragment $701_3$ is the last fragment of the packet 702. For example, the headers 704 may comprise a "last fragment" bit that is de-asserted in the headers $704_1$ and $704_2$ and asserted in the header $704_3$.

One or more of the fragments 701 may comprise validation field data 712 to enable a receiver to validate that the fragment was received without an intolerable number of errors. The validation data may comprise, for example, a checksum. In an embodiment of the invention, validation field 712 may be appended to each fragment 701. In another embodiment of the invention, validation field 712 may be appended only to last fragments transmitted before a preemption event takes effect. In this manner, a single validation field 712 may be utilized to validate multiple fragments transmitted prior to the preemption.

Figure 7B:
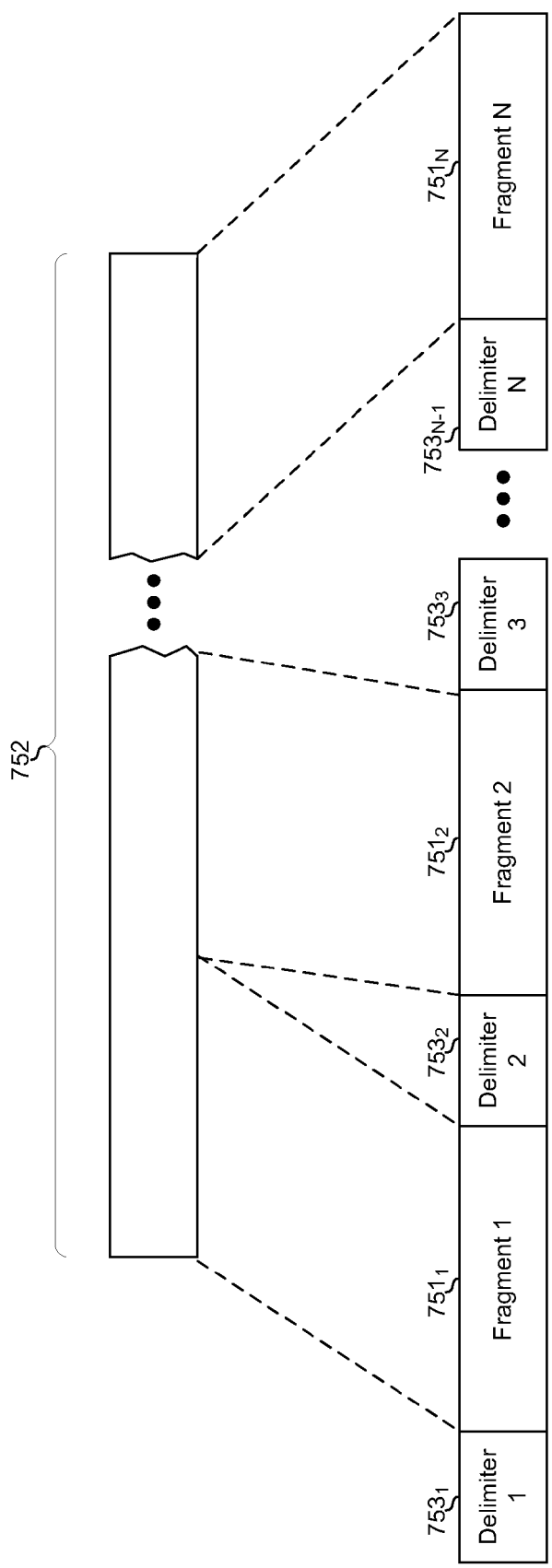
FIG. 7B is a diagram illustrating fragmentation to enable preemption, in accordance with an embodiment of the invention.

FIG. 7B is a diagram illustrating fragmentation to enable preemption, in accordance with an embodiment of the invention. Referring to FIG. 7B, there is shown a packet 752, a plurality of fragments $751_1$-$751_N$ generated from the packet 752, and a plurality of delimiters $753_1$-$753_N$.

In an embodiment of the invention, the packet 752 may correspond to one or more packets arriving at the MAC 108a and fragmentation may take place in the MAC 108a. In an embodiment of the invention, the packet 752 may correspond to one or more packets arriving at the PHY 110a and fragmentation may take place in the PHY 110a. The size of the packet 752 could be programmable and/or could be determined during operation of the Ethernet device generating the packet 752. In an embodiment of the invention, the packet 752 may comprise a plurality of packets generated at a higher OSI layer. For example, each packet 752 in an Ethernet device may be at least 1500 bytes and may carry a plurality of 64-byte control packets.

Each of the fragments 751 may, for example, comprise a payload containing bits of the packet 752. In various embodiments of the invention, the size of each of the fragments $753_1$-$753_N$ may be the same, or a size of one or more of the fragments $753_1$-$753_N$ may be different than the size of another one or more of the fragments $753_1$-$753_N$. In an embodiment of the invention, the size of each of the fragments $753_1$-$753_N$ may be programmable, dynamically negotiable and/or, dynamically determined during operation of the Ethernet device generating the fragments $753_1$-$753_N$.

In an embodiment of the invention, the delimiters $753_1$-$753_N$ may comprise information which may enable a receiver to properly receive the fragments when a preemption event occurs. That is, the delimiters may contain information that, in FIG. 7A, is carried in the headers 704. In an embodiment of the invention, each of the delimiters $753_1$-$753_N$ may comprise a start of frame field indicating whether it is the first fragment of a packet. In FIG. 7B, the start of frame field may be asserted in delimiter $753_1$ and may be de-asserted in the remaining delimiters $753_2$-$753_N$. In an embodiment of the invention, each of the delimiters $753_1$-$753_N$ may comprise one or more fragment count fields which may indicate, for example, the value of 'N', that is, indicate how many fragments are generated from the packet 752. In an embodiment of the invention, each of the delimiters $753_1$-$753_N$ may comprise a sequence number that may enable detection of a lost fragment and/or re-ordering of received fragments in instances that they are received out of order.

Figure 8:
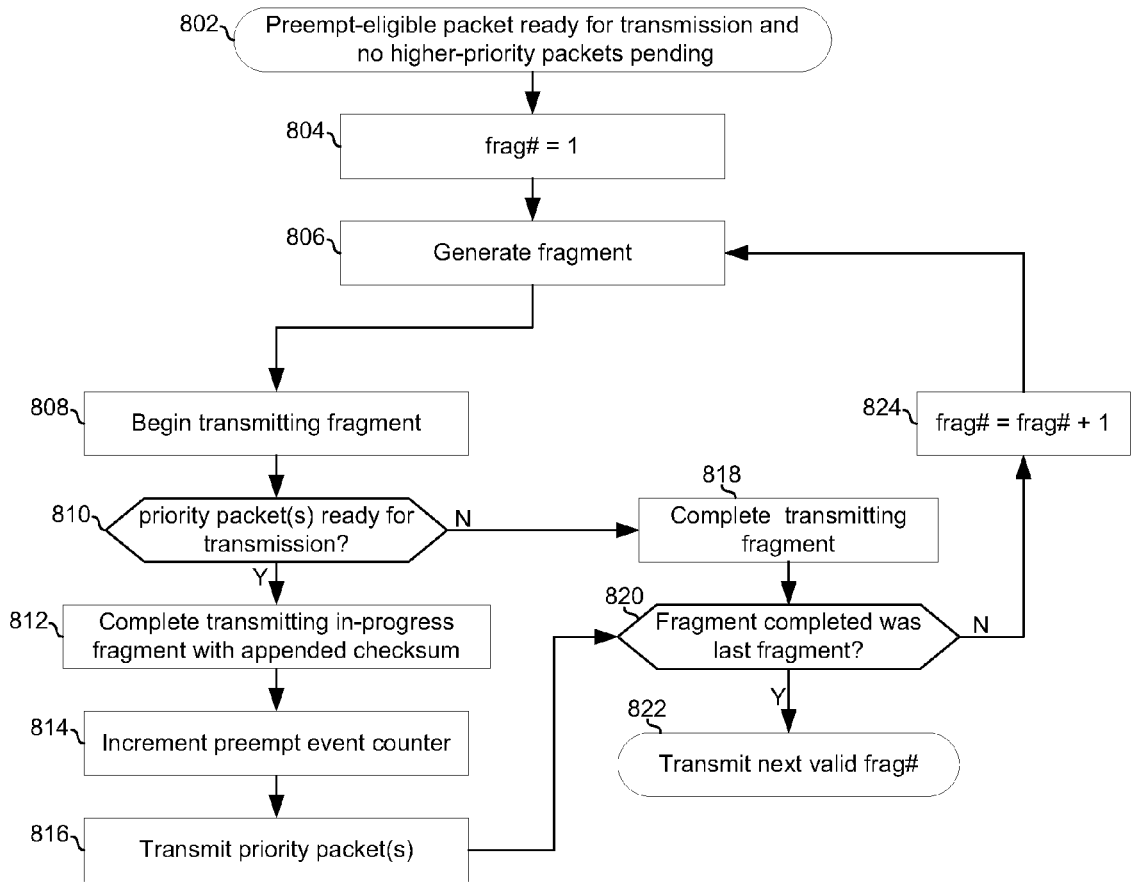
FIG. 8 is a flow chart illustrating exemplary steps performed by a transmitter that is configured and/or operable to preempt and resume transmission of a packet, in accordance with an embodiment of the invention.

FIG. 8 is a flow chart illustrating exemplary steps performed by a transmitter that is configured and/or operable to preempt and resume transmission of a packet, in accordance with an embodiment of the invention. Referring to FIG. 8, the exemplary steps may begin with step 802 when a preemptable packet, such as the packet 702 (FIG. 7) is ready for transmission and no higher-priority traffic is waiting to be transmitted. In step 804, a fragment sequence counter may be initialized to 1. In step 806, the device 102 may begin fragmenting the packet and generate a first fragment such as the fragment $701_1$ (FIG. 7).

In step 808, the device 102 may begin transmitting the fragment $701_1$ onto link 112. In step 810, if one or more higher-priority packets are now pending transmission onto the link 112, then the exemplary steps may advance to step 812. In step 812, the device 102 may complete transmitting the current fragment and append a validation field to validate the contents of fragments transmitted since transmission of the packet 702 began or since the last preemption event. In step 814, the device 102 may increment a preempt event counter. In step 816, the device 102 may transmit the higher-priority packet(s) and the steps may advance to step 820.

In step 820, the device 102 may determine whether the fragment transmitted in the most recent iteration of step 812 was the last fragment of packet 702. If so, then the exemplary steps may advance to step 822 and the device 102 may transmit the next valid fragment sequence number to its link partner. The next valid sequence number may be communicated in the header or a null fragment. The next valid fragment sequence number may enable the receiver to correctly identify the next fragmented packet transmitted by the device 102. If the next fragment received has a sequence number different that the number communicated in step 822, that may indicate a fragment was lost or corrupted.

Returning to step 820, if the fragment transmitted in the most recent iteration of step 812 was not the last fragment of packet 702, then the exemplary steps may advance to step 824. In step 824, the frame sequence counter may be incremented. Subsequently, the steps may return to step 806.

Returning to step 810, if one or more higher-priority packets are not pending transmission onto the link 112, then the exemplary steps may advance to step 818 and transmission of the fragment may be completed. Subsequent to step 818, the exemplary steps may advance to step 820.

Figure 9:
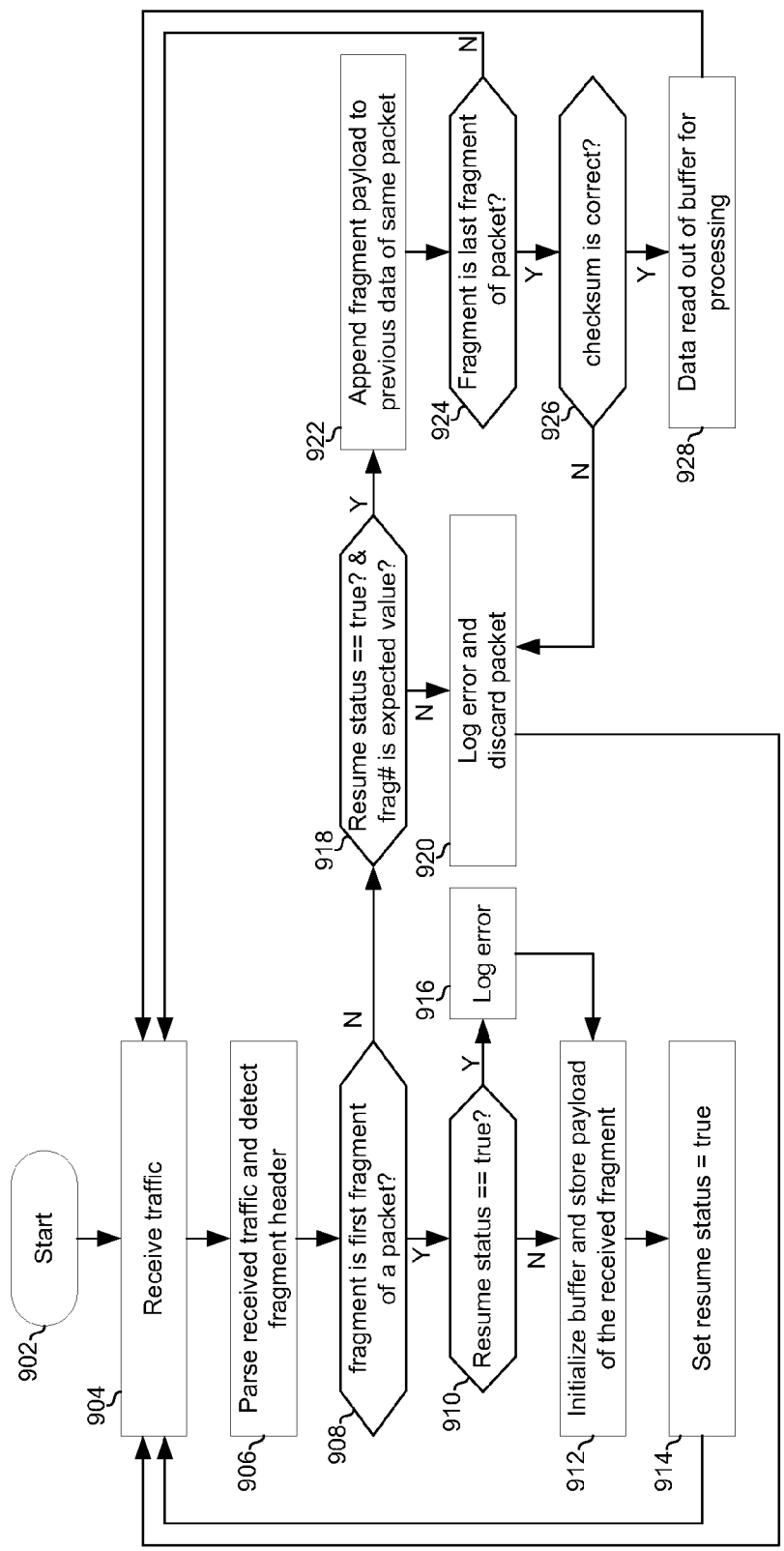
FIG. 9 is a flow chart illustrating exemplary steps performed by a receiver that is configured and/or operable to receive packets which may be preempted by another packet, in accordance with an embodiment of the invention.

FIG. 9 is a flow chart illustrating exemplary steps performed by a receiver that is configured and/or operable to receive packets which may be preempted by another packet, in accordance with an embodiment of the invention. Referring to FIG. 9, after start step 902, the exemplary steps may advance to step 904. In step 904, the device 104 may begin receiving fragment $701_1$ on the link 112. In step 906, the device 104 may parse the received traffic and detect the fragment header $704_1$. Based on the presence of the fragment header $704_1$ and/or based on one or more fields of the detected header $704_1$ the device 104 may determine that the packet 702 being received may be preempted. The device 104 may respond accordingly by, for example, setting one or more flags, storing context information extracted from the header $704_1$, and/or buffering the received traffic in an appropriate buffer.

In step 908 the device 104 may determine whether the received fragment is the first fragment of a packet. This determination may be based on, for example, the fragment sequence number in the fragment header $704_1$. Upon determining that the fragment is the first fragment of a packet, in step 706 it may be determined whether the device 104 was expecting fragments of a different packet which had been preempted. If so, then in step 916 the device 104 may log an error. Then, in step 912, a buffer for storing the preempt-eligible packet may be initialized and the device 104 may begin receiving and buffering the packet 702. In step 914, the device 104 may set a "resume status" flag to "true." This flag may indicate that reception of a preempt eligible packet is in process. Should a preemption even occur, the resume status being true may indicate that a partial packet has been received and, thus, additional fragments of that packet are expected once the preempting traffic completes.

Returning to step 908, in instances that the fragment is not the first fragment of a packet, then the exemplary steps advance to step 918. In step 918, it may determined whether the received fragment is an expected fragment of a packet whose reception is in-progress. For example, if the resume status flag is true, indicating that the device has received one or more fragments of an in-progress packet, and if the sequence number of the received fragment matches an expected next sequence number of in-progress packet, then it may be determined that the received fragment is the expected fragment. In such instances, the exemplary steps may advance to step 922.

In step 922, the received fragment may be appended to the previously received fragment(s) of the in-progress packet. In step 924, it may be determined whether the fragment is the last fragment of the packet. This may be determined, for example, based on a header of the fragment and/or based on a validation field 712 being appended to the end of the fragment. In instances that the fragment is the last fragments of the in-progress packet, then in step 926 the received packet may be validated to ensure that it wasn't corrupted during transmission and reception. If validation fails, the exemplary steps may advance to step 920. In step 920, the received packet, or portion thereof, may be discarded and an error may be logged.

Returning to step 926, if received packet is validated, then in step 928 the packet may be read out of the buffer for processing and/or forwarding. A packet may be validated by, for example, ensuring that a calculated checksum matches an expected checksum.

Figure 10:
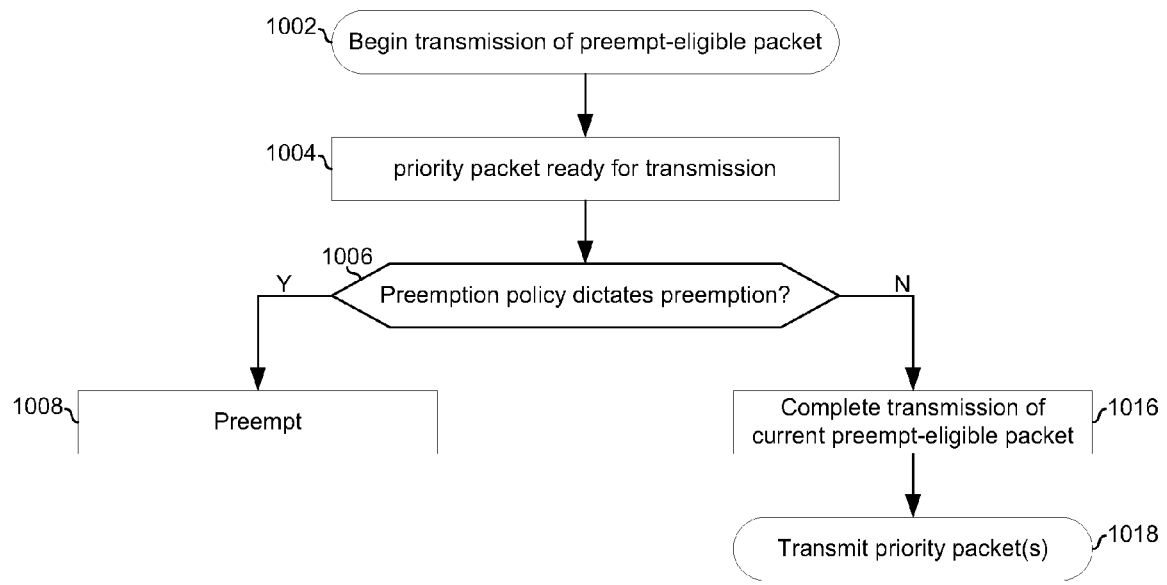
FIG. 10 is a flow chart illustrating exemplary steps for implementing a preemption policy, in accordance with an embodiment of the invention.

FIG. 10 is a flow chart illustrating exemplary steps for implementing a preemption policy, in accordance with an embodiment of the invention. Referring to FIG. 10, the exemplary steps may begin with step 1002 in which the device 102 may begin transmitting a preempt-eligible packet onto link 112. In step 1004, a high-priority packet may become ready for transmission onto the link 112. In step 1006, the device 102 may determine whether the preempt-eligible packet should be preempted by the high-priority packet.

In an embodiment of the invention, the determination may be based on how much of the preempt-eligible packet remains to be transmitted. For example, if less than a threshold number of bits of the preempt-eligible packet remain to be transmitted, the device 102 may complete transmission of the preempt-eligible packet before beginning transmission of the high-priority packet. On the other hand, if more than the threshold number of bits remains, the device 102 may preempt transmission of the preempt-eligible packet and transmit the high-priority packet. The threshold may be set to any suitable value including 0.

In instances that it is determined to preempt transmission of the preempt-eligible packet, then, in step 1008, transmission of the preempt-eligible packet may be paused in favor of transmitting the priority traffic. After transmitting the priority traffic, the preempted traffic may be retransmitted in its entirety or resume from where it left off. In instances that it is determined not to preempt transmission of the preempt-eligible packet, then, in step 1016, transmission of the preempt-eligible packet may complete. Then, in step 1018, the priority packet may be transmitted.

Figure 11:
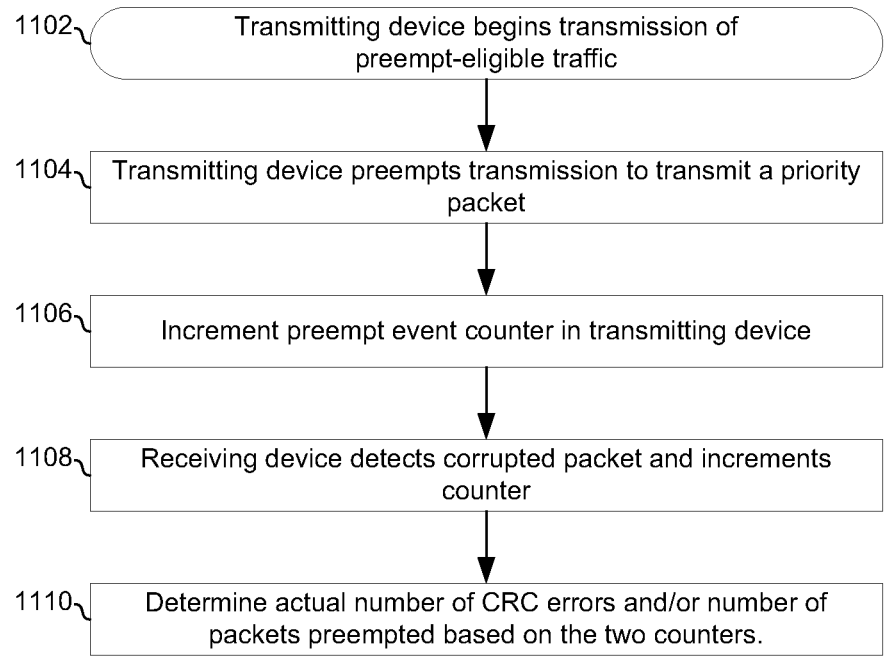
FIG. 11 is a flow chart for determining the status of a network link which supports packet preemption, in accordance with an embodiment of the invention.

FIG. 11 is a flow chart for determining the status of a network link which supports packet preemption, in accordance with an embodiment of the invention. Referring to FIG. 11, the exemplary steps may begin with step 1102 when the device 102 begins transmitting low-priority traffic. In step 1104, the device 102 may preempt transmission of the low-priority traffic to transmit high-priority traffic. To indicate the preemption to the receiving device 104, the device 102 may transmit a delimiter 612 or other indication. The delimiter 612 may ensure that the receiving device 104 will detect a transmit error and discard the partial packet received prior to the preemption. In step 1106, the device 102 may increment a preemption event counter to reflect the preemption event in step 1104. In step 1108, the receiving device may be receiving the low-priority traffic and may detect a transmit error as a result of the delimiter 612. In response to the detected error, the device 104 may increment an error counter and discard the partially received packet. In step 1110, the preemption event counter of the device 102 and the error counter of the device 104 may be utilized to determine how many packets were preempted (i.e., the lower value of the two counter values) and/or how many actual transmit errors occurred on the link (i.e., the receiving device's counter value minus the number of preempted packets). For example, subtracting the preemption event counter value from the error counter value may provide the number of actual transmit errors that occurred on the link.

Aspects of a method and system for low-latency networking are provided herein. In various embodiments of the invention, an Ethernet device 102 may utilize a first buffer 504 for storing low-priority frames and a second buffer 502 for storing high-priority frames. While transmitting a first Ethernet frame 510 from the first buffer 504 onto a network link 112, the Ethernet device 102 may decide to stop transmitting the first Ethernet frame 510 prior to completing transmission of the first Ethernet frame 510. Subsequent to this decision, the Ethernet device 102 may stop transmitting the first Ethernet frame 510 from the first buffer 504 onto the Ethernet link 112. Subsequent to stopping transmission of the first Ethernet frame 510, the Ethernet device 102 may transmit a second frame 514 from the second buffer 502 onto the Ethernet link 112. Upon completing transmission of the second frame 512 from the second buffer 502 onto the Ethernet link 112, the Ethernet device 102 may resume transmission of the first frame 510 from the first buffer 504 onto the Ethernet link 112. Resuming transmission may comprise retransmitting at least some of the portion of the first frame 510 that was transmitted prior to stopping transmission of the first frame 510. Resuming transmission may comprise resuming transmission of the first frame 504 at the bit immediately following the last bit of the first frame 510 transmitted prior to stopping transmission of the first frame 510. The decision may be performed in response to detecting that the second frame 514 is buffered in the second buffer 502. The decision may be based on how much of the first frame 510 has been transmitted and/or how much of the first frame 510 remains to be transmitted. The Ethernet device 102 may fragment the first Ethernet frame 510 into one or more fragments 701. Subsequent to deciding to stop transmission of the first frame 510 and prior to stopping transmission, the Ethernet device 102 may finish transmitting an in-progress fragment 701 and append a validation field 612 to the in-progress fragment.

In various embodiments of the invention, a network device 104 may comprise a first buffer 520 utilized for storing received low-priority Ethernet frames and a second buffer 620 utilized for storing received high-priority Ethernet frames. The Ethernet device 102 may receive, via an Ethernet link 112, a first portion of a low-priority Ethernet frame 510 and store the first portion of the low-priority Ethernet frame 510 in the first buffer 520. Subsequent to receiving the first portion of the low-priority Ethernet frame 510, the Ethernet device 104 may receive, via the Ethernet link, a high-priority Ethernet frame 514 and store the high-priority Ethernet frame 514 in the second buffer 620. Subsequent to receiving the high-priority Ethernet frame 620, the Ethernet device 104 may receive, via the Ethernet link 112, the second portion of the low-priority Ethernet frame 510 and append it to the contents of the first buffer 520. The Ethernet device 104 may parse the received low-priority Ethernet frame 510 to detect fragmentation headers 704. The Ethernet device 104 may determine whether the second portion of the low-priority Ethernet frame 510 is the last portion of the low-priority Ethernet frame 510 based on a fragmentation header 704 in the second portion of the low-priority Ethernet frame 510. The Ethernet device 104 may determine whether one or more fragments 701 of the low-priority Ethernet frame 510 were lost or corrupted based on the fragmentation headers 701.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for packet preemption for low latency.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method comprising:
in a network device:
allocating a first buffer for storing low priority frames;
allocating a second buffer for storing high priority frames;

while transmitting a first frame from the first buffer via a communication link and prior to completing transmission of the first frame:
  determining to preempt transmission of the first frame in response to availability of a second frame in the second buffer; and
  stopping transmission of the first frame via the communication link; and
  after stopping the transmission of the first frame, transmitting the second frame stored in the second buffer via the communication link;
determining a number of bits of the first frame that have been transmitted; and
after completing transmission of the second frame via the communication link, restarting transmission of an entirety of the first frame via the communication link in response to the transmitted number of bits of the first frame being less than a threshold, else resuming transmission of the first frame by transmitting, via the communication link, a portion of the first frame that was not yet transmitted.

2. The method according to claim 1, wherein determining to preempt the transmission of the first frame comprises detecting the second frame is stored in the second buffer.

3. The method according to claim 1, wherein determining to preempt the transmission of the first frame is based on how much of the first frame has been transmitted.

4. The method according to claim 1, wherein determining to preempt the transmission of the first frame comprises determining that the first frame had not previously been preempted more than a threshold number of times specified by a preemption limit value.

5. A system comprising:
a first buffer configured to buffer low priority frames;
a second buffer configured to buffer high priority frames;
circuitry in communication with the first and second buffers, the circuitry configured to:
  transmit a portion of a first frame from the first buffer via a communication link, the first frame comprising more than the portion transmitted;
    determine to preempt transmission of the first frame in response to receipt of a second frame in the second buffer; and
    stop transmission of the first frame via the communication link after the portion of the first frame; and
  after completion of the transmission of the portion of the first frame, transmit the second frame stored in the second buffer via the communication link; and
  after completion of transmission of the second frame via the communication link, based on a number of bits in the transmitted portion of the first frame being less than a threshold, transmit the entire first frame, including the transmitted portion of the first frame via the communication link, or transmit a subsequent portion of the first frame via the communication link based on the number of bits in the transmitted portion of the first frame not being less than the threshold.

6. The system according to claim 5, wherein the circuitry is configured to determine to preempt the transmission of the first frame based on how much of the first frame has been transmitted.

7. The system according to claim 5, wherein the circuitry is configured to determine to preempt the transmission of the first frame by determining that the first frame had not previously been preempted more than a threshold number of times specified by a preemption limit value.

8. A method comprising:
in a network device:
allocating a first buffer for storing low priority packets;
allocating a second buffer for storing high priority packets;
while transmitting a first packet from the first buffer via a communication link and prior to completing transmission the first packet:
  determining to preempt transmission of the first packet by stopping transmission of the first packet via the communication link in response to detecting a second packet being stored in the second buffer; and
transmitting the second packet stored in the second buffer via the communication link; and
after completing transmission of the second packet via the communication link, restarting transmission of an entirety of the first packet, including a portion of the first packet transmitted prior to the preemption, via the communication link in response to a number of bits of the first packet transmitted prior to the preemption being less than a threshold, or restarting transmission of a portion of the first packet remaining to be transmitted in response to the number of bits of the first packet transmitted prior to the preemption being greater than the threshold.

9. The method of claim 8, further comprising transmitting a preemption delimiter via the communication link after stopping the transmission of the first packet and prior to transmitting the second packet.

10. The method of claim 8, wherein determining to preempt the transmission of the first packet is based on one or both of:
how much of the first packet has been transmitted; and
how much of the first packet remains to be transmitted.

11. A system comprising:
a first buffer configured to buffer low priority frames;
a second buffer configured to buffer high priority frames;
circuitry in communication with the first and second buffers, the circuitry configured to:
  transmit a fragment of a first packet from the first buffer via a communication link, wherein the fragment is one of a plurality of fragments of the first packet;
  stop transmission of the first packet via the communication link after transmission of the fragment in response to a second packet being stored in the second buffer;
  transmit the second packet stored in the second buffer via the communication link; and
  after transmission of the second packet via the communication link, restart transmission of the first packet in entirety, including the fragment of the first packet that was previously transmitted, via the communication link, in response to a number of bits of the fragment of the first packet being less than a threshold, or restart transmission of the first packet by transmitting remaining fragments of the first packet via the communication link in response to a size of the fragment being greater than a threshold.

12. The system of claim 11, wherein the circuitry is configured to stop the transmission of the first packet after transmission of the fragment in response to detection of the second packet being stored in the second buffer.

13. The system of claim 11, wherein the circuitry is further configured to:
- corrupt bits in the fragment; and
- transmit the corrupted fragment as a preemption delimiter via the communication link after the transmission of the fragment of the first packet and prior to transmission of the second packet.

14. The system of claim 11, wherein the circuitry is configured to determine to preempt the transmission of the first packet based on one or both of:
- the number of bits of the fragment of the first packet that have been transmitted; and
- a number of bits of the first packet that remain to be transmitted.

15. The system of claim 14, wherein the circuitry is further configured to determine the preemption of the transmission of the first packet based on a preemption limit value and a number of times the first packet was previously preempted, wherein the preemption limit value is configurable by a network administrator.

16. The method of claim 10, wherein determining to preempt the transmission of the first packet is further based on a preemption limit value and a number of times the first packet was previously preempted.

17. The method of claim 1, further comprising: transmitting a preemption delimiter that is indicative of the preemption of the first frame, the preemption delimiter comprising one or more bits of the first frame in a corrupt order.

* * * * *